(12) United States Patent
Usami

(10) Patent No.: US 7,894,319 B2
(45) Date of Patent: Feb. 22, 2011

(54) OPTICAL RECORDING MEDIUM, METHOD OF PRODUCING THE SAME, AND, OPTICAL RECORDING METHOD AND OPTICAL REPRODUCING METHOD

(75) Inventor: Yoshihisa Usami, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 804 days.

(21) Appl. No.: 11/513,049

(22) Filed: Aug. 31, 2006

(65) Prior Publication Data

US 2007/0054195 A1 Mar. 8, 2007

(30) Foreign Application Priority Data

Sep. 6, 2005 (JP) ............................. 2005-257877

(51) Int. Cl.
*G03F 7/00* (2006.01)
*G11B 7/00* (2006.01)

(52) U.S. Cl. .......................................... 369/103; 430/2
(58) Field of Classification Search .............. 369/275.1, 369/103; 430/2
See application file for complete search history.

(56) References Cited

U.S. PATENT DOCUMENTS

| | | | |
|---|---|---|---|
| 6,574,174 B1* | 6/2003 | Amble et al. ............. | 369/44.26 |
| 6,590,852 B1* | 7/2003 | McCormick, Jr. ....... | 369/112.23 |
| 2004/0001400 A1* | 1/2004 | Amble et al. ............. | 369/44.26 |
| 2004/0180266 A1 | 9/2004 | Hirao et al. | |
| 2004/0228259 A1* | 11/2004 | Nagata et al. ............. | 369/275.1 |
| 2004/0257959 A1* | 12/2004 | Arai et al. ............... | 369/112.05 |
| 2005/0083799 A1* | 4/2005 | Horimai ................... | 369/44.28 |
| 2009/0135702 A1* | 5/2009 | Usami et al. ................. | 369/100 |

FOREIGN PATENT DOCUMENTS

| | | |
|---|---|---|
| EP | 1162614 A | 12/2001 |
| EP | 1596376 A | 11/2005 |
| EP | 1708180 A | 10/2006 |
| EP | 1821299 A | 8/2007 |
| EP | 1912102 A | 4/2008 |
| JP | 11-311936 | 11/1999 |
| JP | 2002-123949 | 4/2002 |
| JP | 2004-265472 | 9/2004 |
| WO | 01/78068 A | 10/2001 |
| WO | 2004/070714 A | 8/2004 |
| WO | 2006/059516 A | 6/2006 |
| WO | 2006/114835 A | 11/2006 |

OTHER PUBLICATIONS

An Extended European Search Report dated Nov. 6, 2007.

* cited by examiner

*Primary Examiner*—William J Klimowicz
*Assistant Examiner*—Andrew J Sasinowski
(74) *Attorney, Agent, or Firm*—Sughrue Mion, PLLC

(57) ABSTRACT

The present invention is intended to provide optical recording media of hologram type capable of high-density recording and capable of preventing noise even when the informing light and the reference light leak from filter layers formed of wavelength-selective reflection films. Accordingly, the present invention relates to optical recording media has a first substrate, a recording layer, a filter layer, an optical absorption layer and a second substrate in this order, wherein the recording layer records information by use of holography; methods of producing the same, as well as optical recording methods for the recording media and optical reproducing methods. Preferably, the optical absorption layer absorbs a light having a wavelength within 350 nm to 600 nm and transmits a light having a wavelength within 600 nm to 900 nm.

9 Claims, 9 Drawing Sheets

OPTICAL RECORDING MEDIUM, METHOD OF PRODUCING THE SAME, AND, OPTICAL RECORDING METHOD AND OPTICAL REPRODUCING METHOD

BACKGROUND OF THE INVENTION

1. Field of the Invention

The present invention relates to optical recording media, which being appropriately utilized for wavelength-selective reflection films in optical recording media of hologram type capable of high density image recording, methods of producing the optical recording media, as well as optical recording methods and optical reproducing methods that utilize the optical recording media.

2. Description of the Related Art

One type of recording media capable of recording large amounts of information e.g. high-density image data is optical recording media. These optical recording media have been commercially introduced, for example, in a form of rewritable optical recording media such as optical magnetic discs and phase change optical discs and in a form of recordable optical recording media such as CD-Rs. These optical recording media have been limitlessly demanded for their still larger capacity. However, all of optical recording media have conventionally been based on two-dimensional record, which forces a limit in a sense for increasing their recording capacity. Accordingly, optical recording media of hologram type are attracting attention in recent years that are capable of recording in three-dimensional fashion.

The optical recording media of hologram type typically record information in a way that an informing light having a two-dimensional intensity distribution and a reference light having approximately the same intensity with the reference light are duplicated at inside of a photosensitive recording layer, thereby causing a distribution of an optical property e.g. refractive index by use of an interference pattern formed by the lights. On the other hand, when recorded information is to be read or reproduced, only the reference light is irradiated onto the recording layer in the similar arrangement as at the recording, and the diffracted light having the intensity distribution corresponding to the optical property distribution formed inside the recording layer is emitted from the recording layer.

In the optical recording media of hologram type, the optical property distribution is three-dimensionally formed inside the recording layer, therefore, one region where information being recorded by an informing light and another region where information being recorded by another informing light can be partially overlapped, thus multiple recording can be realized. When digital volume holography synthesized by computers is available, the original information can be reproduced exactly even if the overwriting lowers somewhat the signal/noise ratio (S/N ratio) by virtue that the S/N ratio can be made remarkably higher at one spot. As a result, the multiple recording times may be extended into as long as several hundred times, and the recording capacity of optical recording media may be increased remarkably (see Japanese Patent Application Laid-Open UP-A) No. 2002-123949).

As for the optical recording media of hologram type, for example, optical recording medium 20 is proposed, as shown in FIG. 1, which is provided with servo pit pattern 3 at the surface of second substrate 1, reflective film 2 formed of aluminum etc. on the surface of the servo pit pattern, recording layer 4 on the reflective film, and first substrate 5 on the recording layer (see JP-A No. 11-311936).

However, there exists such a problem in the optical recording medium 20 having the construction shown in FIG. 1 that the recording density decreases by half due to the construction of the servo zone and recording zone being divided in a plane.

Accordingly, the optical recording medium 20a shown in FIG. 20 utilizes a circular light for the informing and reference lights, and is provided with gap layer 8 for smoothening the second substrate 1, cholesteric liquid-crystalline layer or dichroic mirror layer as filter layer 6, and one-4th wavelength plate 10; and the recording layer and the servo layer are superimposed in the thickness direction (see JP-A No. 2004-265472). This proposal may bring about doubling of the recording density. In addition, when the cholesteric liquid-crystalline layer of mono-layer is utilized as the filter layer that has the same rotating direction with the circular light of the informing light in the spiral configuration, the optical recording media can be mass-produced with higher productivity and lower cost, and also the filter effect may be proper at vertical incidence 0°.

In this proposal, however, noise may be induced by the change of incident angle, i.e. because incident light inclination of no less than 10° tends to cause a shift into the selective reflection wavelength, thus the informing light and the reference light reach the reflective film through the filter layer. This phenomenon leads to a problem that the optical recording media cannot be applied to conventional lens optical systems where the incident light is passes through a diaphragm and exhibits an inclination of no less than ±10°.

In the case of the incident angle being no more than 10°, the informing and the reference lights 35 are entirely subjected to selective reflection at filter layer 6 to yield a return light under normal conditions as shown in FIG. 3; on the contrary, the informing and the reference lights 35 may not be entirely reflected at the filter layer 6 as shown in FIG. 4, that is, a small amount of the lights may leak through the filter layer to reach the reflective film 2 and may reflect by the reflective film, then the resulting reflected light 35a may get mixed with the diffracted light thereby to cause noise.

Accordingly, the optical recording media of hologram type, capable of preventing noise even when the informing light and the reference light leak from selectively reflective layers, have not been mass-produced yet with higher efficiency and lower cost, thus it is currently desired that the production may be achieved as soon as possible.

SUMMARY OF THE INVENTION

It is an object of the present invention to solve the problems in the art described above and also to attain the purposes described below. That is, the purposes of the present invention are to provide optical recording media of hologram type capable of high-density recording and capable of preventing noise even when the informing light and the reference light leak from filter layers formed of wavelength-selective reflection films, methods of producing the optical recording media with higher efficiency and lower cost, as well as optical recording methods and optical reproducing methods that utilize the optical recording media.

The optical recording medium according to the present invention is characterized in that it comprises a first substrate, a recording layer for recording information by use of holography, a filter layer, an optical absorption layer, and a second substrate in this order.

The optical recording medium according to the present invention comprises the first substrate, the recording layer for recording information by use of holography, the filter layer, the optical absorption layer and the second substrate in this order, therefore, the selective reflection wavelength may be free from its shift even when the incident angle being changed, the informing light and the reference light utilized for recording and reproducing as well as the reproducing light are far from reaching the reflective film, therefore, the diffusing light due to diffuse reflection at the reflective surface may be prevented. Consequently, the noise due to this diffusing light may be free from detection by a CMO sensor or CDD in a condition duplicated with a reproducing image, thus the reproducing image may be detected in a level capable of error correcting. The noise of the diffusing light comes to be more troublesome as the multiplicity comes to higher. That is, when the multiplicity comes to higher, for example, to no less than 10, the diffraction efficiency by one hologram comes to remarkably lower, which makes very difficult to detect reproducing images when the diffusion noise exists. The present invention may make possible to remove such difficulty and to realize image recording with exceptionally high density. In addition, the optical absorption layer formed between the filter layer and the second substrate may make possible to absorb the recording light leaking from the filter layer thereby to reproduce reproductive images with less distortion.

The inventive filter for optical recording media is characterized in that it is constructed by laminating the inventive filter layer on a substrate.

The inventive method of producing optical recording media is one for producing the optical recording medium according to the present invention, which is characterized in that the method comprises a step of forming a filter layer that forms a filter layer on a second substrate and a step of laminating an optical absorption that laminates an optical absorption layer on the second substrate.

In accordance with the inventive method of producing optical recording media, a filter layer of a laminated body of laminated cholesteric liquid crystal layers is provided on the second substrate. As a result, the optical recoding media can be mass-produced with higher efficiency and lower cost by way of convenient processes such as spraying.

The optical recording method according to the present invention is characterized in that the informing light and the reference light are irradiated onto the optical recording medium according to the present invention in a manner that the optical axis of the informing light coincides with the optical axis of the informing light, thus information is recorded on the recording layer by means of the interference pattern generated by the interference between the informing light and the reference light.

The optical recording method of the present invention may achieve exceptionally high density recording, by virtue that the informing light and the reference light are irradiated using the optical recording medium according to the present invention in a manner that the optical axis of the informing light coincides with the optical axis of the informing light, and information is recorded on the recording layer by means of the interference pattern generated by the interference between the informing light and the reference light.

The optical reproducing method according to the present invention is characterized in that the information is reproduced by way of irradiating the reproducing light, which being same with the reference light, onto the interference pattern of the recording layer to which the information being recorded by the inventive optical recording method described above.

In accordance with the inventive optical reproduction method described above, the interference pattern of the recording layer to which the information being recorded by the inventive optical recording method can be efficiently exactly read thereby to reproduce the high density information.

DESCRIPTION OF THE PREFERRED EMBODIMENTS

Optical Recording Medium

The optical recording medium according to the present invention comprises a first substrate, a recording layer for recording information by use of holography, a filter layer, an optical absorption layer and a second substrate in this order, and also other layers properly selected as required.

Optical Absorption Layer

Figure 5:
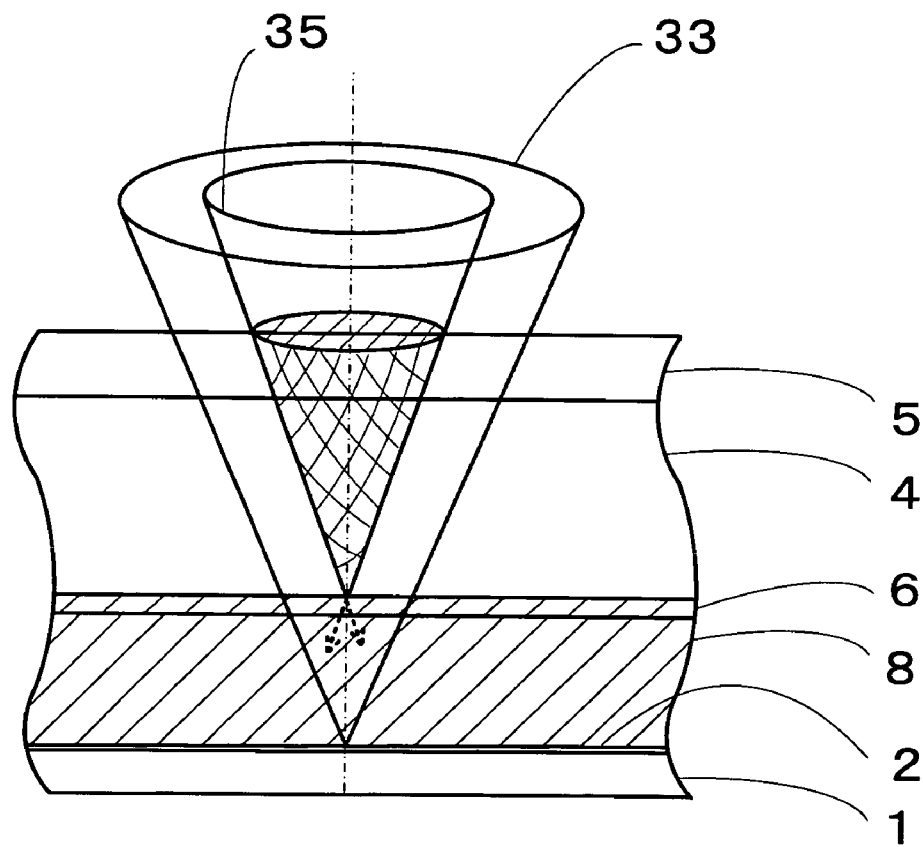
FIG. 5 is a conceptual view that explains the function of the optical absorption layer of optical recording media according to the present invention.

The optical absorption layer performs to absorb the light having not been reflected (see arrow marks in FIG. 5) due to insufficient wavelength selective reflection at the filter layer, to prevent mixing into the diffracted light of the light having leaked from the filter layer, and to enhance the signal/noise ratio (SN ratio). Therefore, it is preferred that the position to form the optical absorption layer is defined between the filter layer and the second substrate.

The wavelength of the light to be absorbed by the optical absorption layer (hereinafter sometimes referred to as "first light") may be properly selected depending on the purpose without limitation, for example, the wavelength is preferably 350 to 600 nm, more preferably 400 to 550 nm. When the wavelength is less than 350 nm, it is difficult to maintain stable absorption, and when over 600 nm, it is also difficult to maintain stable absorption.

The optical absorption layer also possesses the property to transmit the light of 600 to 900 nm wavelength (hereinafter sometimes referred to as "second light"). More preferably, the wavelength of the transmitting light is 650 to 850 nm.

The light transmissivity of the optical absorption layer may be properly selected depending on the purpose without limitation; for example, the average transmissivity is preferably 0.001 to 50% with respect to the light to be absorbed, more preferably 0.01 to 20%. When the average transmissivity is less than 0.001%, it may lack long-term stability due to increase of color material, and when over 50%, the light absorption performance intended in the present may not be sufficient.

The average transmissivity is preferably 50 to 100% with respect to the tracking servo light other than the absorbed light, more preferably 60 to 95%. When the transmissivity is less than 50%, the light amount of the tracking servo may be lower. The numerical ranges are to be defined for the wavelengths only with respect to recording/reproducing and tracking servo light rather than the preferable entire wavelength region.

The method for measuring the transmissivity may be properly selected depending on the purpose; for example, it may be measured for a test piece of 2 cm by 2 cm by 10 μm thick using a spectrophotometer.

The measuring instrument for the transmissivity may be properly selected depending on the purpose, for example, from measuring instruments for transmissivity using visual light, spectrophotometers etc.

The components of the optical absorption layer may be properly selected depending on the purpose; examples thereof include color materials such as dyes and pigments, binders and other components.

Examples of the preferable color materials include phthalocyanine dyes, cyanine dyes, azo dyes, quinophthalone dyes, flavanthrone dyes, anthraquinone dyes, isoindoline dyes, perylene dyes and manganese dyes. Among these, phthalocyanine dyes, cyanine dyes and azo dyes are preferable. These may be used alone or in combination of two or more. In addition, commercial inks for screen printing may be preferable that is colored already.

Examples of the binder include natural organic polymer materials such as gelatins, cellulose derivatives, dextrans, rosins and gums; hydrocarbon resins such as polyethylenes, polypropylenes, polystyrenes and polyisobutylenes; vinyl resins such as polyvinyl chloride, polyvinylidene chloride and copolymers of polyvinyl chloride/polyvinyl acetate; acrylic resins such as polymethyl acrylate and polymethyl methacrylate; and synthetic organic polymers such as polyvinyl alcohols, polyethylene chloride, epoxy resins, butyral resins, gum derivatives and primary condensates of thermosetting resins such as phenol/formaldehyde resins. These may be used alone or in combination of two or more.

When the binder is added to the optical absorption layer, the additive amount is typically 20 parts by mass or less based on 100 parts by mass of the color material, preferably 10 parts by mass or less, more preferably 5 parts by mass or less.

In addition, color-degradation inhibitors, binding materials etc. may be added as the other components into the coating liquid for forming the optical absorption layer as required; and also various additives such as oxidation inhibitors, UV absorbents, plasticizers and lubricants may be added depending on the purpose.

Examples of the color-degradation inhibitors include nitroso compounds, metal complexes, diinmonium salts and aluminum salts. Specific examples thereof are described in JP-A Nos. 02-300288, 03-224793 and 04-146189 etc.

The thickness of the optical absorption layer may be properly selected depending on the purpose; for example, the thickness is preferably 0.1 to 200 μm, more preferably 1 to 100 μm, most preferably 2 to 40 μm.

When a first gap layer described later is formed adjacent to the optical absorption layer between the optical absorption layer and the second substrate, the total thickness of the optical absorption layer and the first gap layer is preferably 1 to 200 μm, more preferably 5 to 150 μm, most preferably 10 to 100 μm.

Filter Layer

The filer layer performs wavelength-selective reflection in a manner that a light with a certain wavelength may be solely reflected among plural lights or beams. The filter layer may perform in particular to prevent diffuse reflection of the informing light and the reference light from the reflective film of the optical recording medium and to prevent noise generation without the sift of selective reflection wavelength even if the incident angle being altered; therefore, the lamination of the filter layer with the optical recording medium may achieve optical recording with excellently high resolution and diffraction efficiency.

The filter layer may be properly selected depending on the purpose; for example, the filter layer may be formed of a laminated body containing a dichroic mirror layer, a color material-containing layer, a dielectric vapor deposition layer, a cholesteric layer of mono layer or two or more layers, and other layers properly selected as required.

The filter layer may be laminated directly to the substrate by way of coating etc. along with the recording layer; alternatively, a filter for optical recording media is prepared by laminating on a substrate such as films, then the filter for an optical recording medium may be laminated on the substrate.

Dichroic Mirror Layer

Preferably, plural of the dichroic mirror layers are laminated in order to prepare a wavelength-selective reflection film. The number of laminated layers is preferably 1 to 50 layers, more preferably 2 to 40 layers, most preferably 2 to 30 layers. When the number is more than 50, the production efficiency tends to be deteriorated due to vapor deposition onto multiple layers, the change rate of the spectral transmission comes to lower, thus the effect per increasing layer number comes to lower.

The method of laminating the dichroic mirror layers may be properly selected depending on the purpose; examples of the method include vacuum vapor deposition processes such as ion plating and ion beam, physical vapor deposition (PVD) such as sputtering, and chemical vapor deposition (CVD). Among these methods, vacuum vapor deposition and sputtering are preferable, and the sputtering is most preferable.

As for the sputtering, DC sputtering is preferable because it offers high deposition rate. Preferably, highly conductive material is used when DC sputtering is employed.

Examples of the method for depositing multiple dielectric thin layers by sputtering include a single-chamber method, where multiple dielectric thin layers are alternately or sequentially deposited using a single chamber, and a multi-chamber method, where multiple dielectric thin layers are sequentially deposited using multiple chambers. In view of the productivity and to prevent contamination among materials, the multi-chamber method is most preferable.

The thickness of the dichroic mirror layer is preferably $\lambda/16$ to $\lambda$, more preferably $\lambda/8$ to $3\lambda/4$, most preferably $\lambda/6$ to $3\lambda/8$ in terms of optical wavelength.

Color Material-Containing Layer

The color material-containing layer is formed from a color material, binder resin, solvent and optional other components.

The color material is preferably at least one of pigments and dyes; among these, red dyed and red pigments are preferable from the viewpoint of absorbing the light of 532 nm and transmitting the servo light of 655 nm or 780 nm. Particularly preferable are the red pigments.

The red dye may be properly selected from conventional ones without limitation; examples thereof include acid dyes such as C.I. ACID RED 1, C.I. ACID RED 8, C.I. ACID RED 13, C.I. ACID RED 14, C.I. ACID RED 18, C.I. ACID RED 26, C.I. ACID RED 27, C.I. ACID RED 35, C.I. ACID RED 37, C.I. ACID RED 42, C.I. ACID RED 52, C.I. ACID RED 82, C.I. ACID RED 87, C.I. ACID RED 89, C.I. ACID RED 92, C.I. ACID RED 97, C.I. ACID RED 106, C.I. ACID RED 111, C.I. ACID RED 114, C.I. ACID RED 115, C.I. ACID RED 134, C.I. ACID RED 186, C.I. ACID RED 249, C.I. ACID RED 254 and C.I. ACID RED 289; basic dyes such as C.I. BASIC RED 2, C.I. BASIC RED 12, C.I. BASIC RED 13, C.I. BASIC RED 14, C.I. BASIC RED 15, C.I. BASIC RED 18, C.I. BASIC RED 22, C.I. BASIC RED 23, C.I. BASIC RED 24, C.I. BASIC RED 27, C.I. BASIC RED 29, C.I. BASIC RED 35, C.I. BASIC RED 36, C.I. BASIC RED 38, C.I. BASIC RED 39, C.I. BASIC RED 46, C.I. BASIC RED 49, C.I. BASIC RED 51, C.I. BASIC RED 52, C.I. BASIC RED 54, C.I. BASIC RED 59, C.I. BASIC RED 68, C.I. BASIC RED 69, C.I. BASIC RED 70, C.I. BASIC RED 73, C.I. BASIC RED 78, C.I. BASIC RED 82, C.I. BASIC RED 102, C.I. BASIC RED 104, C.I. BASIC RED 109 and C.I. BASIC RED 112; and reactive dyes such as C.I. Reactive Red 1, Reactive Red 14, Reactive Red 17, Reactive Red 25, Reactive Red 26, Reactive Red 32, Reactive Red 37, Reactive Red 44, Reactive Red 46, Reactive Red 55, Reactive Red 60, Reactive Red 66, Reactive Red 74, Reactive Red 79, Reactive Red 96 and Reactive Red 97. These may be used alone or in combination of two or more.

The red dye may be properly selected from conventional ones depending on the purpose without limitation; examples thereof include C.I. PIGMENT RED 9, C.I. PIGMENT RED 97, C.I. PIGMENT RED 122, C.I. PIGMENT RED 123, C.I. PIGMENT RED 149, C.I. PIGMENT RED 168, C.I. PIGMENT RED 177, C.I. PIGMENT RED 180, C.I. PIGMENT RED 192, C.I. PIGMENT RED 209, C.I. PIGMENT RED 215, C.I. PIGMENT RED 216, C.I. PIGMENT RED 217, C.I. PIGMENT RED 220, C.I. PIGMENT RED 223, C.I. PIGMENT RED 224, C.I. PIGMENT RED 226, C.I. PIGMENT RED 227, C.I. PIGMENT RED 228, C.I. PIGMENT RED 240, C.I. PIGMENT RED 48:1, Permanent Carmine FBB (C.I. PIGMENT RED 146), Permanent Ruby FBH (C.I. PIGMENT RED 11), Fastel Pink B sputa (C.I. PIGMENT RED 81). These may be used alone or in combination of two or more.

Among these, such red pigments are preferably utilized in particular that exhibit a light transmission spectrum of no more than 10% for 532 nm light and no less than 90% for 655 nm light.

The content of the color material is preferably 0.05 to 90% by mass based on the total solids mass in the color material-containing layer, more preferably 0.1 to 70% by mass. When the content is less than 0.05% by mass, the color material-containing layer may be necessary for a thickness of 500 μm or more, when the content is more than 90% by mass, the color material-containing layer may lose the self-stability, and the film may collapse while producing the color material-containing layer.

Binder Resin

The binder resin may be properly selected from conventional ones depending on the purpose; examples thereof include polyvinylalcohol resins; vinylchloride-vinylacetate copolymers; copolymers of vinylchloride and/or vinyl acetate and at least one selected from vinyl alcohols, maleic acid, and acrylic acid; vinylchloride-vinilidenechloride copolymers; vinylchloride-acrylonitrile copolymers; ethylene-vinylacetate copolymers; cellulose derivatives such as nitrocellulose resins; polyacrylic resins; polyvinylacetal resins; polyvinylbutyral resins; epoxy resins; phenoxy resins; polyurethane resins and polycarbonate resins. These may be use alone or in combination of two or more.

To further improve the dispersivity and durability, a polar group(s) is preferably introduced into molecules of the aforementioned binder resin. Examples of the polar group are an epoxy group, $-CO_2H$, $-OH$, $-NH_2$, $-SO_3M$, $-OSO_3M$, $-PO_3M_2$, $-OP_3M_2$ and the like, provided that M is at least any one of hydrogen atom, alkali metals and ammonium. Moreover, in the case where plural Ms are present in the one polar group, such Ms may be mutually different. The content of the polar group is preferably $10^{-6}$ equivalence to $10^{-4}$ equivalence per one gram of the binder resin.

The aforementioned binder resins are preferably hardened by adding a crosslinking agent selected from conventional isocyanate compounds etc.

The content of the binder resin is preferably 10 to 99.95% by mass based on the total solids mass in the color material-containing layer, more preferably 30 to 99.9% by mass.

The respective components are dissolved or dispersed into a suitable solvent to prepare a coating liquid, then the coating liquid is coated on a substrate described later by desirable coating processes, thereby the color material-containing layer may be formed.

The solvent may be properly selected from conventional ones depending on the purpose; examples thereof include water; alkoxypropionic acid esters such as 3-methoxypropionic acid methylester, 3-methoxypropionic acid ethylester, 3-methoxypropionic acid propylester, 3-ethoxypropionic acid methylester, 3-ethoxypropionic acid ethylester and 3-ethoxypropionic acid propylester; alkoxy alcohol esters such as 2-methoxypropylacetate, 2-ethoxypropylacetate and 3-methoxybutylacetate; lactic acid esters such as methyl lactate and ethyl lactate; ketones such as methyl ethyl ketone, cyclohexanone and methylcyclohexanone; γ-butyrolactone; N-methylpyrrolidone; dimethylsulfoxide; chloroform; and tetrahydrofuran. These solvents may be used alone or in combination of two or more.

The coating process may be properly selected depending on the purpose; examples thereof include inkjet processes, spin coating processes, kneader coating processes, bar coating processes, blade coating processes, casting processes, dipping processes and curtain coating processes.

The thickness of the color material-containing layer is preferably 0.5 to 200 μm, more preferably 1.0 to 100 μm. When the thickness is less than 0.5 μm, the binder resin for enclosing the color material to form a film may be impossible to include in a sufficient content, when it is more than 200 μm, the excessively thick filter may require excessively large optical systems for irradiation light and servo light.

Dielectric Vapor Deposition Layer

The dielectric vapor deposition layer is disposed on the color material-containing layer, and is formed from a laminate of two or more dielectric thin layers having different refractive indices. For the dielectric vapor deposition layer to serve as a wavelength-selective reflection film, a laminate is preferably that contains alternating dielectric thin layers with higher and lower refractive indices; in this connection, three or more different dielectric thin layers may be laminated.

The number of the laminated layers is preferably 2 to 20, more preferably 2 to 12, still further preferably 4 to 10, and most preferably 6 to 8. When the number of the laminated layers is greater than 20, it results in productivity degradation because of multilayer vapor deposition, and the object and effect of the present invention may hardly be achieved.

The order for laminating the dielectric thin layers may be properly selected depending on the purpose. For example, a dielectric thin layer with lower refractive index is deposited first in a case where the adjacent dielectric thin layer has a higher refractive index; on the other hand, a dielectric thin layer with a higher refractive index is deposited first in a case where the adjacent dielectric thin layer has a low refractive index. The threshold of refractive index for determining whether a dielectric thin layer has a high or low refractive index is preferably set to 1.8. Note, however, that this determination is made on an arbitrary basis. That is, dielectric thin layers with different refractive indices equal to or greater than 1.8 (i.e., there are dielectric thin layers with high and low refractive indices) may be used to form such a laminate.

The materials for the dielectric thin layer with higher refractive indices may be properly selected depending on the purpose without limitation; examples thereof include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$ and $ZrO_2$. Among these, $Bi_2O_3$, $CeO_2$, $CeF_3$, $HfO_2$, $SiO$, $Ta_2O_5$, $TiO_2$, $Y_2O_3$, $ZnSe$, $ZnS$ and $ZrO_2$ are preferable, and $SiO$, $Ta_2O_5$, $TiO_2$, $Y_2O_3$, $ZnSe$, $ZnS$ and $ZrO_2$ are more preferable.

The material for the dielectric thin layer with lower refractive indices may be properly selected depending on the purpose without limitation; examples thereof include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$ and $ThF_4$. Among these, $Al_2O_3$, $BiF_3$, $CaF_2$, $MgF_2$, $MgO$, $SiO_2$ and $Si_2O_3$ are preferable, and $Al_2O_3$, $CaF_2$, $MgF_2$, $MgO$, $SiO_2$ and $Si_2O_3$ are more preferable.

The atomic ratio in the material for the dielectric thin layer may also be properly selected depending on the purpose; the atomic ratio may be adjusted by changing the gas concentration of atmosphere upon deposition of dielectric thin layers.

The process for laminating the dielectric thin layer may be may also be properly selected depending on the purpose; for example, the process may be employed that is similar with those for laminating the dichroic mirror layers described above.

The thickness of the dielectric thin layer is preferably $\lambda/16$ to $\lambda$, more preferably $\lambda/8$ to $3\lambda/4$, most preferably $\lambda/6$ to $3\lambda/8$ in terms of optical wavelength order.

As for the dielectric vapor deposition layer, a portion of light propagating through the dielectric vapor deposition layer is reflected at the respective dielectric vapor deposition layers in a multiple manner, the respective reflected lights interfere each other, as a result allowing selectively to transmit only the light having the wavelength defined by the product of the thickness of the dielectric vapor deposition layer and the refractive index of the film for the light. In addition, the central transmission wavelength of the dielectric vapor deposition layer represents an angular dependence with respect to incident light, thus the transmission wavelength may be changed by altering the incident light.

Although the number of the laminated layers of 20 or less in the dielectric vapor deposition layer may allow a few percent to a few tens percent of the light having the selective reflection wavelength to leak and to transmit through the filter, the leaked light may be absorbed by the color material-containing layer disposed underneath the dielectric vapor deposition layer. In addition, the color material-containing layer contains a red pigment or red dye, thus it absorb the light of 350 to 600 nm while transmitting the light of 600 to 900 nm which being utilized for the servo light.

The filter for optical recording media with the color material-containing layer and the dielectric vapor deposition layer preferably reflects the first light and transmits the second light different from the first light; preferably, the wavelength of the first light is 350 to 600 nm and the wavelength of the second light is 350 to 600 nm. In this connection, the construction of the optical recording media is preferably such that the recording layer, dielectric vapor deposition layer, color material-containing layer and servo pit pattern are laminated in this order from the optical system side.

In addition, the filter layer represents the light transmissivity of 50% or more for 655 nm at the incident angle of ±40°, preferably 80% or more, and the light reflectivity of 30% or more at 532 nm, preferably 40% or more.

Cholesteric Liquid Crystal Layer

The cholesteric liquid crystal layer contains at least a nematic liquid crystal compound and a chiral compound, and also contains polymerizable monomers and other components as required.

The cholesteric liquid crystal layer may be of single-layered or multi-layered. The number of the laminated layers in the multi-layered configuration may be properly selected depending on the purpose; preferably, the number of the laminated layer is 2 to 10. When the number exceeds 10, the production efficiency may be lowered due to overload for the coating, possibly resulting in less achievement of the purpose and effect of the present invention.

Preferably, the cholesteric liquid crystal layer may display a circularly polarizing function. The cholesteric liquid crystal layer selectively reflects light components which have been circularly polarized in the direction in which the liquid crystal helix rotates (i.e., to the right or left) and which have a wavelength that equals to the pitch of the liquid crystal helix. The cholesteric liquid crystal layer utilizes the selective reflection characteristics to separate a particular circularly polarized component of a particular wavelength from natural light of different wavelengths, and reflects the other light components.

Accordingly, it is preferred that each of the cholesteric liquid crystal layers reflects the first light and transmits the second light different from the first light, and it is preferred that the wavelength of the first light is 350 to 600 nm, and the wavelength of the second light is 600 to 900 nm.

Typically, the cholesteric liquid crystal layer may exhibit the selective reflectivity for a certain wavelength region rather than for wavelengths of the entire visible lights. That is, the wavelength width $\Delta\lambda$ of the selective reflection region may be expressed by the Equation (1) below.

$$\Delta\lambda=2\lambda(ne-no)/(ne+no): \qquad \text{Equation (1)}$$

in which "no" represents the refractive index of the nematic liquid crystal molecules for normal light, contained in the cholesteric liquid crystal layer, "ne" represents the refractive index of the nematic liquid crystal molecules for abnormal light, and λ represents the central wavelength of light selectively reflected.

As expressed by the Equation (1), the wavelength width Δλ of the selective reflection region depends on the molecular configuration itself of the nematic liquid crystal. It is understood from the Equation (1) that larger (ne–no) may extend the wavelength width Δλ; however, (ne–no) is typically no more than 0.3, and the value higher than 0.3 may make difficult the practical application since the other functions as liquid crystals such as orientation characteristic and liquid crystal temperature are likely to be insufficient. Accordingly, the wavelength width Δλ of the selective reflection region of the cholesteric liquid crystal layer is practically about 150 nm at most, usually is 30 to 100 nm.

The central wavelength λ of selective reflection in the cholesteric liquid crystal layer may be expressed by the Equation (2) below.

$$\lambda = (ne+no)P/2 \qquad \text{Equation (2)}$$

in which "ne" and "no" represent the same meanings with those in the Equation (1); "P" represents a helix pitch length corresponding to one rotational torsion of the cholesteric liquid crystal layer.

As shown in Equation (2), the central wavelength λ of selective reflection depends on the average refractive index of the cholesteric liquid crystal layer and the helix pitch length P, provided that the helix pitch of the cholesteric liquid crystal layer being constant. In order to enhance the selective reflectivity of the cholesteric liquid crystal layer, therefore, it is preferred that each of the cholesteric liquid crystal layers represents different central wavelengths in terms of the selective reflectivity each other and also that the helical rotation directions (right or left) are the same for the respective cholesteric liquid crystal layers. It is also preferred that the regions of selective reflection wavelength are successive with respect to the respective cholesteric liquid crystal layers. The term "successive" as used herein means that there exist no gap between adjacent two regions of selective reflection wavelength and the regions represent substantially a reflective index of no less than 40%. Accordingly, it is preferred that the distances between the central wavelength λ of selective reflections are such that each of the regions of selective reflection wavelength is successive with at least one of other regions of selective reflection wavelength.

The filter layer for optical recording medium preferably has an optical reflectivity of 40% or more for a wavelength range of $\lambda_0$ to $\lambda_0/\cos 20°$ (where $\lambda_0$ represents the wavelength of irradiation light) incident at an angle of ±20° (measured from the normal of the surface of the recording layer). Most preferably, the filter layer for optical recording media has an optical reflectivity of 40% or more for a wavelength range of $\lambda_0$ to $\lambda_0/\cos 40°$ (where $\lambda_0$ represents the wavelength of irradiation light) incident at an angle of ±40° (measured from the normal of the surface of the recording layer). When the optical reflectivity is 40% or more for a wavelength range of $\lambda_0$ to $\lambda_0/\cos 20°$, especially $\lambda_0$ to $\lambda_0/\cos 40°$ (where $\lambda_0$ represents the wavelength of irradiation light), the angle dependency to reflect the irradiation light may be eliminated and thus conventional optical lens systems for usual optical recording media may be employed.

Figure 10:
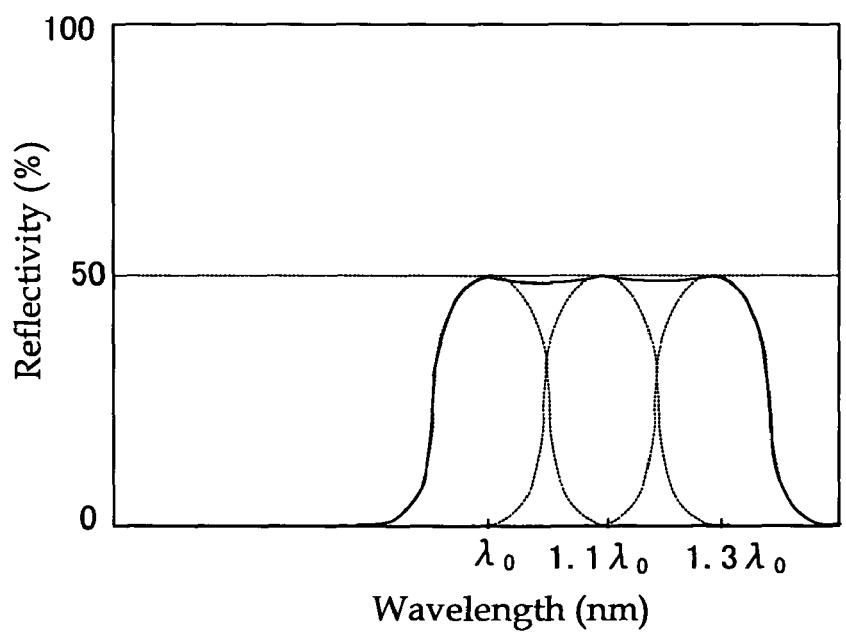
FIG. 10 is a graph showing a reflectivity of a filter of laminated three cholesteric liquid crystal layers in terms of incident light from the normal direction (at 0°) of the filter.
Figure 11:
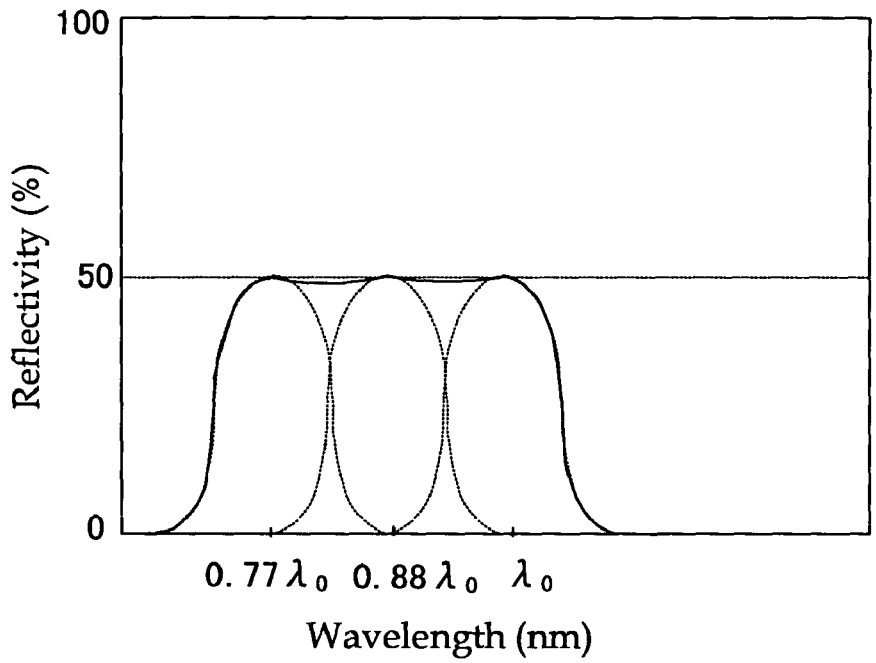
FIG. 11 is a graph showing a reflectivity of a filter of laminated three cholesteric liquid crystal layers in terms of incident light from 40° inclined direction of the filter layer.

Specifically, a filter layer may be produced that has the reflective property as shown in FIG. 10 by way of laminating three cholesteric liquid crystal layers of which the central wavelengths of selective reflectivity are different each other and the helical rotation directions of the respective cholesteric liquid crystal layers are the same each other. FIG. 10 shows that the reflectivity of the normal incident light from front side (0°) is no less than 40%. On the other hand, as the direction of the incident light being inclined, a shift toward shorter wavelength develops gradually; FIG. 11 shows the reflectivity at the angle 40° inclined in the liquid crystal layer.

Figure 12:
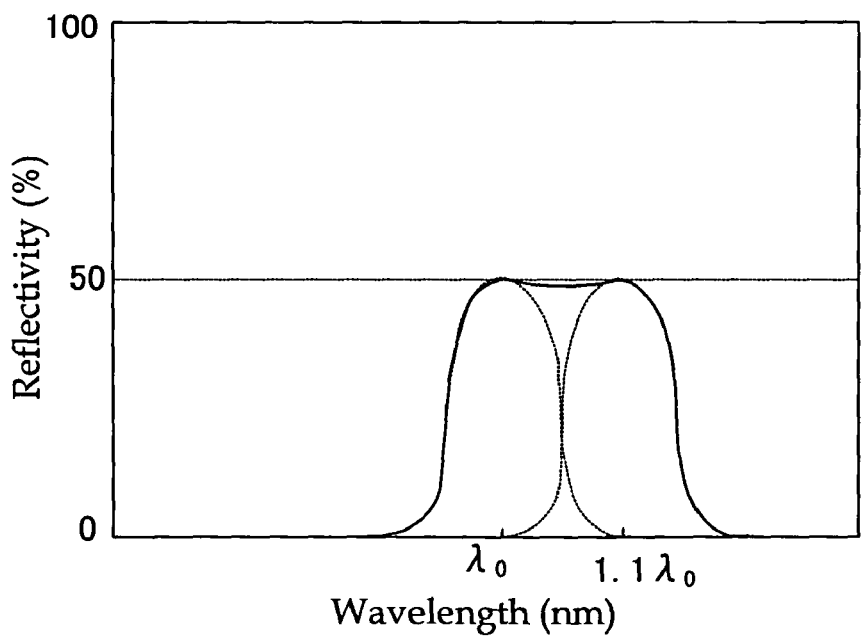
FIG. 12 is a graph showing a reflectivity of a filter of laminated two cholesteric liquid crystal layers in terms of incident light from the normal direction (at 0°) of the filter.
Figure 13:
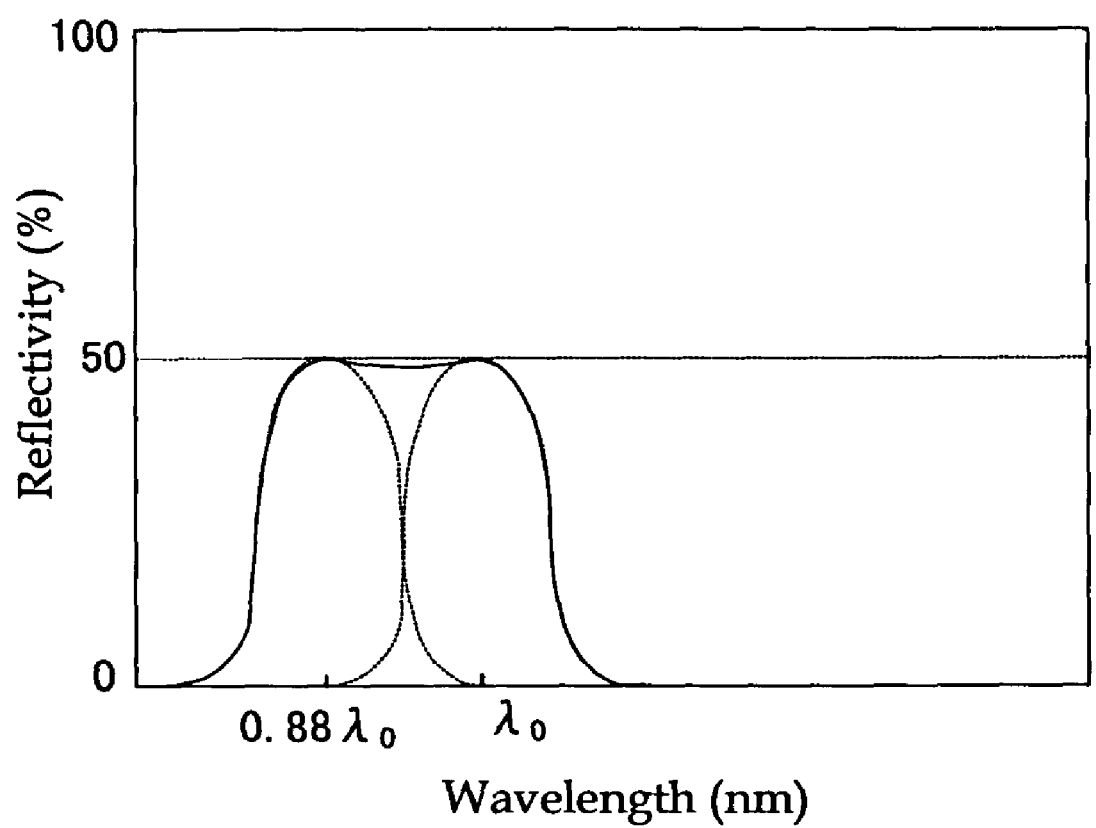
FIG. 13 is a graph showing a reflectivity of a filter of laminated two cholesteric liquid crystal layers in terms of incident light from 20° inclined direction of the filter layer.

Similarly, a filter layer may be produced that has the reflective property as shown in FIG. 12 by way of laminating two cholesteric liquid crystal layers of which the central wavelengths of selective reflectivity are different each other and the helical rotation directions of the respective cholesteric liquid crystal layers are the same each other. FIG. 12 shows that the reflectivity of the normal incident light from front side (0°) is no less than 40%. On the other hand, as the direction of the incident light being inclined, a shift toward shorter wavelength develops gradually; FIG. 13 shows the reflectivity at the angle 20° inclined in the liquid crystal layer.

Note that with respect to the reflection range of $\lambda_0$ to $1.3\lambda_0$ shown in FIG. 10, $1.3\lambda_0$ equals to 692 nm when $\lambda_0$ is 532 nm, and thus a servo light of wavelength 655 nm is undesirably reflected. This reflection range is set in view of light incident at an angle of ±40°. However, when such light that is incident at larger angles is to be used, a servo operation can be performed with no problems by using a servo light incident at an angle of within ±20° that has been masked. In addition, by securing larger helical pitch in the cholesteric liquid crystal layer in the filter layer used, it is also possible to readily cover a servo light incident to the filter layer an angle of within ±20°. In that case, it is only necessary to prepare a laminate of two cholesteric liquid crystal layers with a reflection range of $\lambda_0$ to $1.1\lambda_0$ as shown in FIG. 12. Thus, transmittance of the servo light entails no difficulty.

Accordingly, the results shown in FIGS. 10 to 13 may assure the reflectivity of no less than 40% even when the incident wavelength being inclined 0° to 20°, preferably 0° to 40° in the filter for optical recording media according to the present invention, filter layers may be provided with no problems for reading signals.

The respective cholesteric liquid crystal layers may be properly selected depending on the purpose as long as satisfying the properties described above; the cholesteric liquid crystal layers contain a nematic liquid crystal compound and a chiral compound, and further contain polymerizing monomers and other components as required.

Nematic Liquid Crystal Compound

The nematic liquid crystal compounds feature that their liquid crystal phase solidifies under their liquid crystal transition temperatures, and may be properly selected from liquid crystal compounds, high-molecular liquid crystal compounds and polymerizable liquid crystal compounds, all of which have refractive index anisotropy Δn of 0.10 to 0.40. For example, molecules of such nematic liquid crystal compounds in a liquid crystal state may be aligned on a substrate treated for the alignment such as rubbing, followed by cooling to immobilize the molecules for an available solid phase.

The nematic liquid crystal compounds may be properly selected depending on the purpose; for example, the following compounds are available.

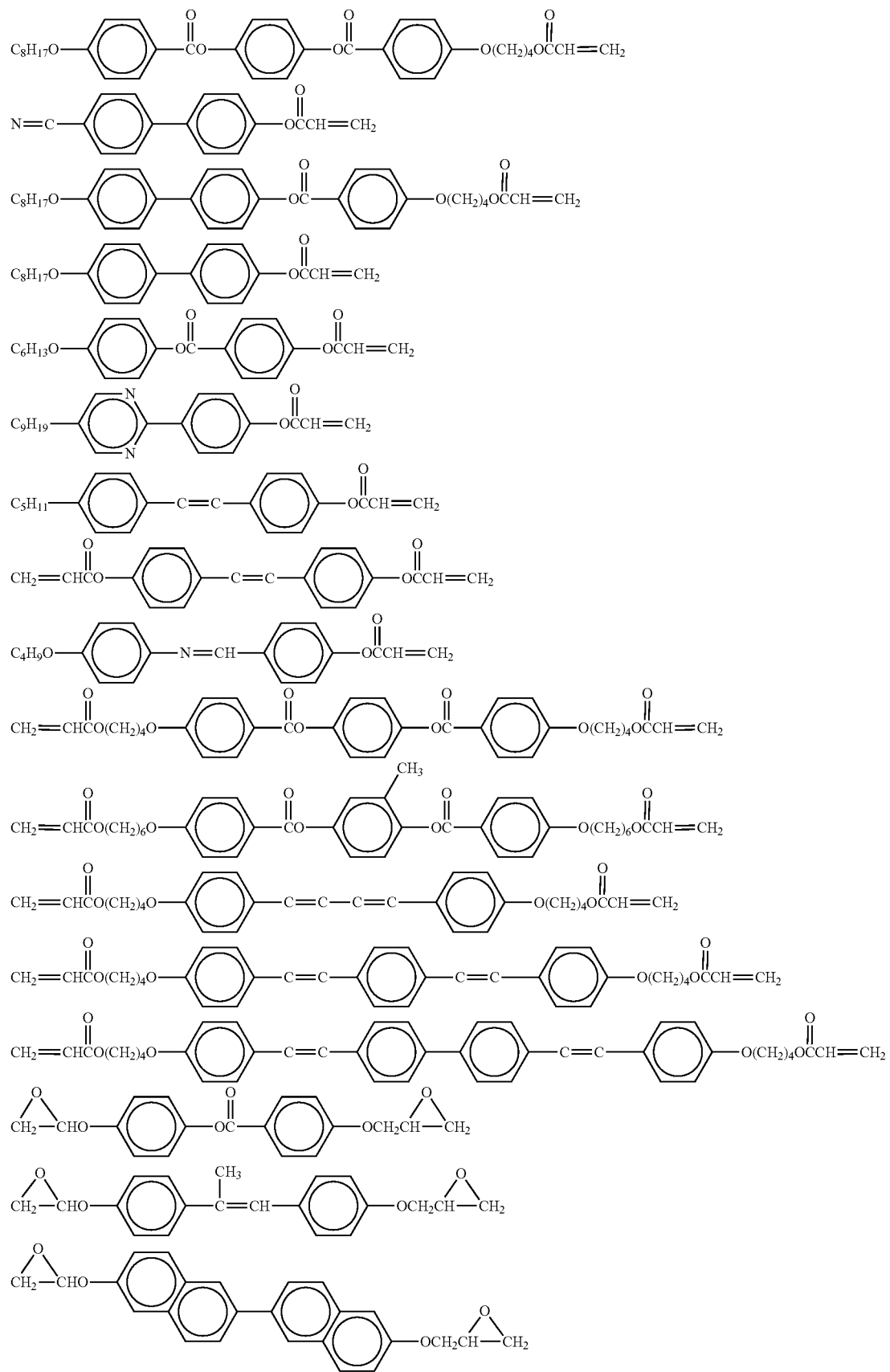

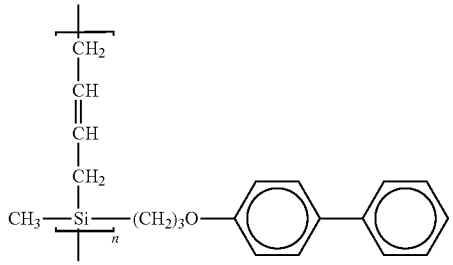

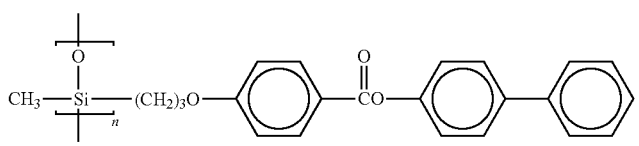

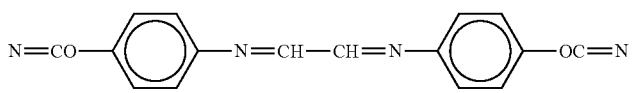

In the equations described above, "n" represents an integer of 1 to 1000. In addition, each of the compounds exemplified above may be properly substituted for the groups connected at the side chains into those of the following structures.

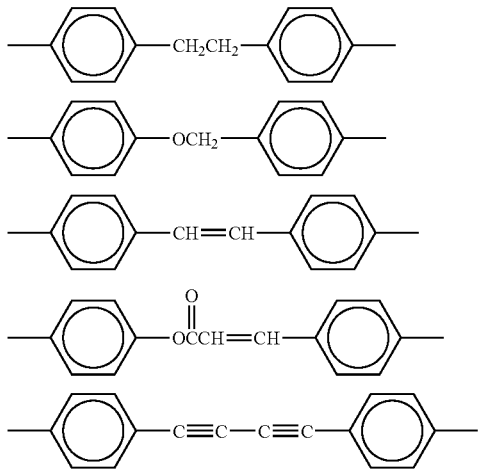

-continued

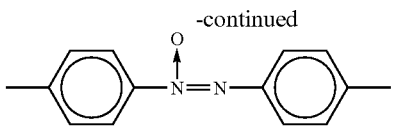

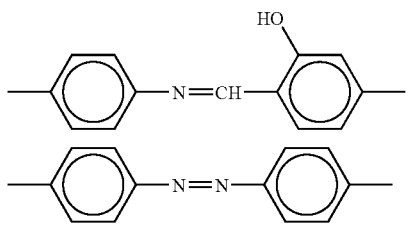

Among the exemplified compounds, the nematic liquid crystal compounds are preferably those having at least a polymerizable group per molecule from the view point of assuring sufficient curing ability. Among these, ultraviolet (UV) polymerizable liquid crystal compounds are preferable. Such UV polymerizable liquid crystal compounds are commercially available; examples thereof include PALIOCOLOR LC242 (product name, by BASF Corp.), E7 (product name, by Merck Ltd.), LC-Silicon-CC3767 (product name, by Wacker-Chem), and L35, L42, L55, L59, L63, L79 and L83 (product name, by Takasago International Corp.).

The content of the nematic liquid crystal compound is preferably 30% by mass to 99% by mass, more preferably 50% by mass to 99% by mass base of the total solids mass of each of the cholesteric liquid crystal layers. When the content of the nematic liquid crystal compound is less than 30% by mass, the alignment of nematic liquid crystal molecules may be insufficient.

Chiral Compound

The chiral compound may be properly selected from conventional ones depending on the purpose; examples thereof include isomannide compounds, catechine compounds, isosorbide compounds, fenchone compounds and carvone compounds in view of the hues of the liquid crystal compounds and for enhanced color purity. These compounds may be used alone or in combination of two or more.

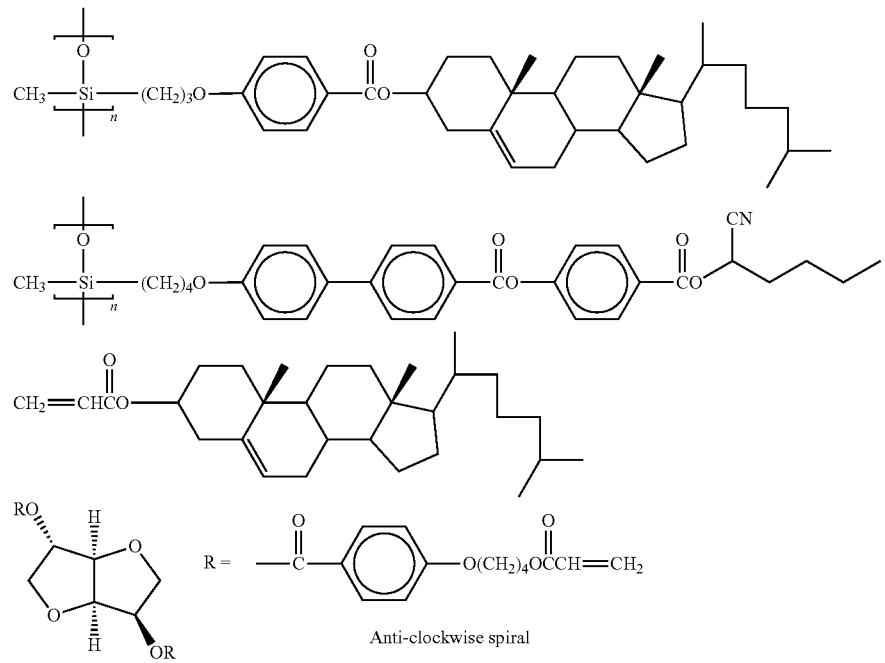
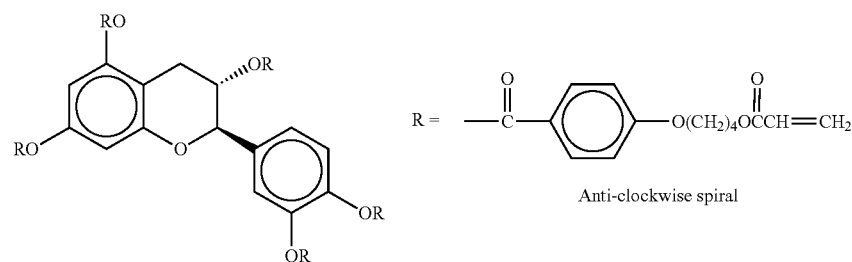
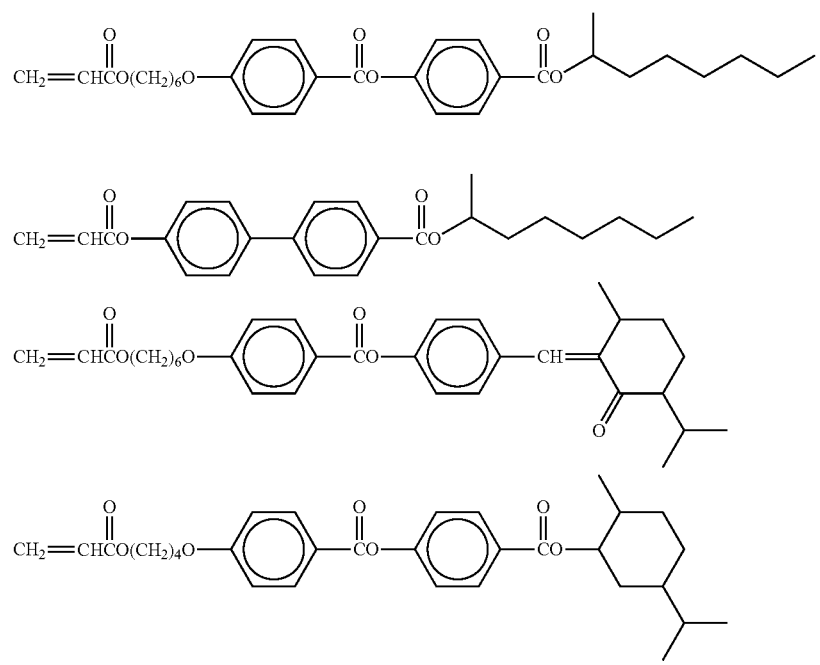

In addition, commercially available chiral compounds may be available; examples thereof include S101, R811 and CB15 (product name, by Merck Ltd.); and PALIOCOLOR LC756 (product name, by BASF Corp.).

The content of the chiral compound in each liquid crystal layer of the multilayered cholesteric liquid crystal layer is preferably no more than 30% by mass, more preferably no more than 20% by mass based on the total solids mass of the respective liquid crystal layer. When the content of the chiral compound is more than 30% by mass, the alignment may be insufficient in the cholesteric liquid crystal layer.

Polymerizable Monomer

Polymerizable monomers may be additionally included to the cholesteric liquid crystal layer in order to, for example, increase the curing level such as film strength. Additional use of polymerizable monomers may increase the strength of the cholesteric liquid crystal layer, where different twisting degrees have been set for liquid crystals through which light propagates (e.g., the distribution of wavelengths of light to be reflected has been created) and where the helical structure (i.e., selective reflection capability) has been fixed. Note, however, that such polymerizable monomers need not necessarily to be added if the liquid crystal compound bears polymerizable groups in a molecule.

The polymerizable monomers may be properly selected from conventional ones depending on the purpose; examples thereof include monomers with an ethylenically unsaturated bonds, more specifically, multifunctional monomers such as pentaerythritoltetraacrylate and dipentaerythritolhexaacrylate.

The specific examples of the monomers with an ethylenically unsaturated bonds are those shown below. These may be used alone or in combination of two or more.

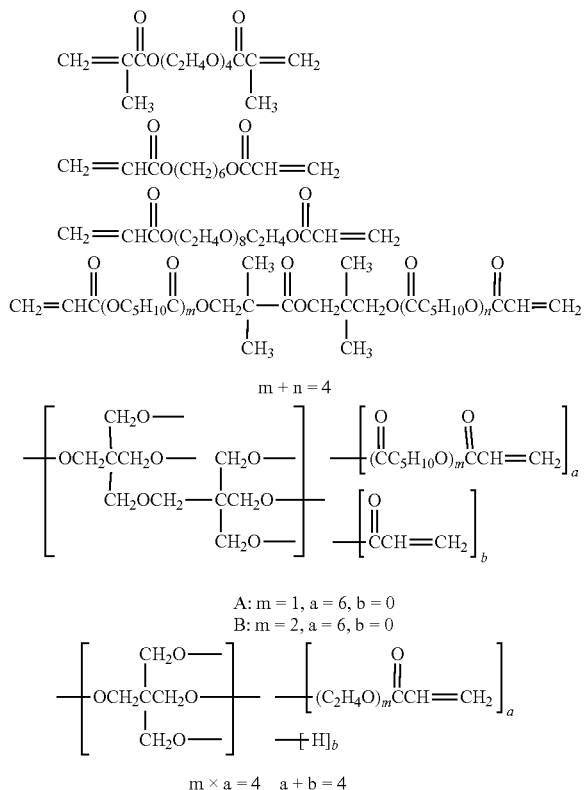

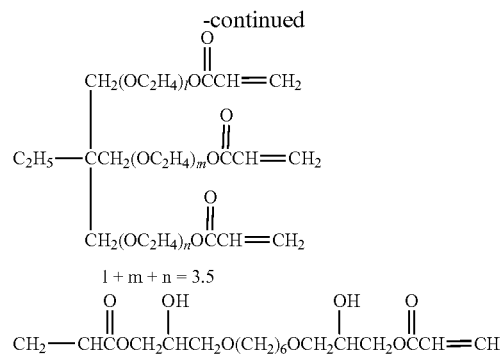

The content of the polymerizable monomers is preferably no more than 50% by mass, more preferably 1% by mass to 20% by mass with respect to the total solids mass of the cholesteric liquid crystal layer. When the content the polymerizable monomers is more than 50% by mass, the alignment may be inhibited in the cholesteric liquid crystal layer.

Other Components

The other components may be properly selected depending on the purpose; examples thereof include photopolymerization initiators, sensitizers, binder resins, polymerization inhibitors, solvents, surfactants, thickeners, dyes, pigments, ultraviolet absorbers and gelling agents.

The photopolymerization may be properly selected from conventional ones without limitation; examples thereof include p-methoxyphenyl-2,4-bis(trichloromethyl)-s-triazine, 2-(p-buthoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzoimidazole, benzyldimethylketal and thioxanthone/amine. These may be used alone or in combination of two or more.

The photopolymerization initiators may be commercially available ones; examples thereof include IRGACURE 907, IRGACURE 369, IRGACURE 784 and IRGACURE 814 (product name, by Ciba Specialty Chemicals KK); and Lucirin TPO (product name, by BASF Corp.).

The content of the photopolymerization initiator is preferably 0.1% by mass to 20% by mass, more preferably 0.5% by mass to 5% by mass base on the total solids mass of the cholesteric liquid crystal layer. When the content of the photopolymerization initiator is less than 0.1% by mass, it may take long time for the polymerization because of reduced curing efficiency upon irradiation with light. When the content of the photopolymerization initiator is greater than 20% by mass, it may result in poor optical transmittance over the spectrum from ultraviolet to visible light.

The sensitizer is added as required in order to increase the cure level in the cholesteric liquid crystal layer. The sensitizer may be properly selected from conventional ones depending on the purpose; examples thereof include diethylthioxanthone and isopropylthioxanthone. The content of the sensitizer is preferably 0.001% by mass to 1% by mass based on the total solids mass of the cholesteric liquid crystal layer.

The binder resin may be properly selected from conventional ones depending on the purpose without limitation; examples thereof include polyvinyl alcohols; polystyrene compounds such as polystyrene and poly-α-methylstyrene; cellulose resins such as methylcellulose, ethylcellulose and acetylcellulose; acid cellulose derivatives having a carboxylic group on their side chains; acetal resins such as polyvinyl formal and polyvinyl butyral; methacrylic acid copolymers; acrylic acid copolymers; itaconic acid copolymers; crotonic acid copolymers; malleic acid copolymers; partially-esterified malleic acid copolymers; homopolymers of acrylic acid alkylesters or homopolymers of methacrylic acid alkyl esters; and polymers having a hydroxyl group. These binder resins may be used alone or in combination of two or more.

Examples of alkyl groups in the homopolymers of acrylic acid alkylesters or homopolymers of methacrylic acid alkyl esters include methyl group, ethyl group, n-propyl group, n-butyl group, isobutyl group, n-hexyl group, cyclohexyl group and 2-ethylhexyl group.

Examples of the polymers having hydroxyl group include benzyl(meth)acrylate/(methacrylic acid homopolymers) acrylic acid copolymers, and multicomponent copolymers of benzyl(meth)acrylate/(meth)acrylic acid/other monomers.

The content of the binder resin is preferably no more than 80% by mass, more preferably no more than 50% by mass based on the total solids mass the cholesteric liquid crystal layer. When the content the polymerizable monomers is more than 80% by mass, the alignment may be insufficient in the cholesteric liquid crystal layer.

The polymerization inhibitor may be properly selected depending on the purpose without limitation; examples thereof include hydroquinones, hydroquinone monoethylethers, phenothiazines, benzoquinones and derivatives thereof. The content of the polymerization inhibitor is preferably 10% by mass or less, more preferably 0.01% by mass to 1% by mass based on the total solid content of the polymerizable monomers.

The solvent may be properly selected from conventional ones depending on the purpose; examples thereof include alkoxypropionic acid esters such as 3-methoxypropionic acid methylester, 3-methoxypropionic acid ethylester, 3-methoxypropionic acid propylester, 3-ethoxypropionic acid methylester, 3-ethoxypropionic acid ethylester and 3-ethoxypropionic acid propylester; alkoxy alcohol esters such as 2-methoxypropylacetate, 2-ethoxypropylacetate and 3-methoxybutylacetate; lactic acid esters such as methyl lactate and ethyl lactate; ketones such as methyl ethyl ketone, cyclohexanone and methylcyclohexanone; γ-butyrolactone; N-methylpyrrolidone; dimethylsulfoxide; chloroform; and tetrahydrofuran. These solvents may be used alone or in combination.

Filter for Optical Recording Medium

The filter for optical recording media is a laminate formed by laminating on the substrate the filter layer and the other layers selected appropriately as required.

Substrate

The substrate may be properly selected in terms of the shape, configuration, size etc. without limitation depending on the purpose; the shape may be flat plate, film sheet etc.; the configuration may be of single-layered or multi-layered; and the size may be appropriately selected depending on the size of the optical recording medium.

The material may be inorganic or organic materials. Examples of the inorganic material include glasses, quartz glass and silicon. Examples of the organic material include acetate resins such as triacetylcellulose, polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinylalcohol resins, polyvinylchloride resins, polyvinilidenechloride resins and polyacrylic resins. They may be used alone or in combination of two or more.

The substrate may be properly prepared or commercially available. The thickness may be properly selected depending on the purpose; preferably the thickness is 10 μm to 500 μm, more preferably 50 μm to 300 μm. When the thickness is less than 10 μm, the adhesiveness may be lower due to deflection of the substrate, and when over 500 μm, the focus sites of informing and reference light are required to shift considerably, which leading to larger size of the optical system.

The filter of the optical recording media may be properly produced by the method of producing the optical recording medium according to the present invention described later. The respective cholesteric liquid crystal layers may be formed, for example, by coating the coating liquids of the respective cholesteric liquid crystal layers on the substrate using a desired process.

As for a method suitable for mass production, the substrate is previously wound in a roll shape, and the coating solution is applied on the substrate using a long continuous coater such as a bar coater, die coater, blade coater and curtain coater.

The thickness of the respective cholesteric liquid crystal layers is preferably 1 to 10 μm, more preferably 2 to 7 μm. When the thickness of the cholesteric liquid crystal layer is less than 1 μm, it likely to result in poor selective reflectivity. When the thickness of the cholesteric liquid crystal layer is more than 10 μm, uniformly aligned liquid crystal molecules in the liquid crystal layer may be disturbed.

The thickness of the filter for optical recording media, i.e. the total thickness of respective liquid crystal layers other than the substrate, is preferably 1 to 30 μm, more preferably 3 to 10 μm.

The respective cholesteric layers may be properly selected depending on the purpose; preferably, the coating liquids of the respective cholesteric layers are coated on the substrate and subjected to aligning and solidifying then punching out along with the substrate into a disc, thereafter disposing on the second substrate. In case of applying as the filter layer of optical recording media, it can be directly arranged on the second substrate without the substrate.

The filters of the optical recording media may be utilized in various industrial fields, in particular, may be appropriately utilized for forming and producing optical recording media of hologram type e.g. the inventive optical recording media of hologram type, and also for methods of producing them as well as optical recording methods and optical reproducing methods.

Recording Layer

Information may be recorded by use of holography on the recording layers. The materials for the recording layers are those capable of changing optical properties such as absorption index or refractive-index depending on intensity of radiation, upon irradiation of electromagnetic wave having a certain wavelength.

The material of the optical recording layer may be properly selected depending on the purpose; examples thereof include (i) polymerizable photopolymers that cause a polymerization reaction upon irradiation, (ii) photorefractive materials that exhibit a photorefractive effect to modulate the refractive index by causing a spatial electric charge distribution upon irradiation, (iii) photochromic materials that modulate the refractive index by causing a molecular isomerization upon irradiation, (iv) inorganic materials such as lithium niobate and barium titanate and (v) chalcogen materials.

The photopolymer of (i) described above may be properly selected depending on the purpose, for example, the photopolymer contains a monomer and a photoinitiator, and also other components such as sensitizer and oligomer as required.

The photopolymer may be one described in, for example, "Photopolymer Handbook" (by Kogyo Chosakai Publishing Co., 1989), "Photopolymer Technology" (by The Nikkan Kogyo Shinbun, Ltd., 1989) and SPIE manuscript Vol. 3291 pp. 89-103 (1998). In addition, the photopolymers described in U.S. Pat. Nos. 5,759,721, 4,942,112, 4,959,284 and 6,221, 536; WO 97/44714, WO 97/13183, WO 99/26112 and WO 97/13183; Japanese Patent Nos. 2880342, 2873126, 2849021, 3057082 and 3161230; and Japanese Patent Application Laid-Open Nos. 2001-316416 and 2000-275859 may also be available.

The process for changing optical properties by irradiating a recording light onto the photopolymer may be based on diffusion of low molecular weight components. A component may be added that diffuses toward the reverse direction with that of the polymerizing component in order to mitigate the volume change on polymerization, or a compound having an acid cleavage structure may be further added in addition to the polymer. When the recording layer is formed using a photopolymer that contains the low molecular weight component, a structure capable of sustaining liquid may be required in the recording layer. When a compound having the acid cleavage structure is added, the volume change may be controlled by compensating the expansion due to the cleavage and the constriction due to the polymer polymerization.

The monomer may be properly selected depending on the purpose; example thereof include radically polymerizable monomers having an unsaturated bond such as acrylic and methacrylic group and cationic polymerization monomers having an ether structure such as epoxy and oxetane ring. These monomers may be monofunctional or polyfunctional and may also be one utilizing a photo-crosslinking reaction.

Examples of the radically polymerizable monomers include acryloyl morpholine, phenoxyethylacrylate, isobomylacrylate, 2-hydroxypropylacrylate, 2-ethylhexylacrylate, 1,6-hexanediol diacrylate, tripropyleneglycol diacrylate, neopentylglycol PO modified diacrylate, 1,9-nonandiol diacrylate, hydroxylpivalic acid neopentylglycoldiacrylate, EO modified bisphenol A diacrylate, polyethyleneglycol diacrylate, pentaerythritol triacrylate, pentaerythritol tetraacrylate, pentaerythritol hexaacrylate, EO modified glycerol triacrylate, trimethylolpropane triacrylate, EO modified trimethylolpropane triacrylate, 2-naphtho-1-oxyethylacrylate, 2-carbazoyl-9-ylethylacrylate, (trimethylsilyloxy)dimethylsilyl propylacrylate, vinyl-1-naphthoate and N-vinylcarbazol.

Examples of the cationic polymerization monomers include bisphenol A epoxy resins, phenolnovolac epoxy resins, glycerol triglycidylether, 1,6-hexaneglycidylether, vinyltrimethoxysilane, 4-vinylphenyl trimethoxysilane, gamma-methacryloxy propyltriethoxysilane and compounds expressed by the formulas (A) to (E) below. These may be used alone or in combination of two or more.

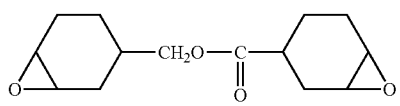

Structural formula A

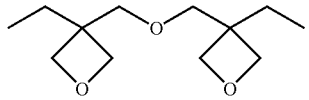

Structural formula B

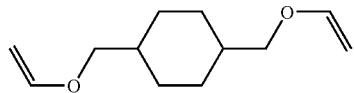

Structural formula C

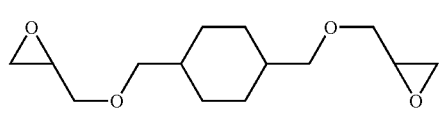

Structural formula D

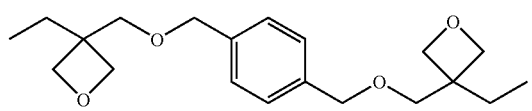

Structural formula E

The photoinitiator may be selected from materials sensitive to the recording light, for example, from those capable of inducing radical polymerization, cation polymerization, crosslinking reaction etc.

Examples of the photoinitiator include 2,2'-bis(o-chlorophenyl)-4,4',5,5'-tetraphenyl-1,1'-biimidazole, 2,4,6-tris (trichloromethyl)-1,3,5-triazine, 2,4-bis(trichloromethyl)-6-(p-methoxyphenylvinyl)-1,3,5-triazine, diphenyliodonium tetrafluoroborate, diphenyliodonium hexafluorophosphate, 4,4'-di-t-butyldiphenylodonium tetrafluoroborate, 4-diethylamino phenylbenzenediazonium hexafluorophosphate, benzoin, 2-hydroxy-2-methyl-1-phenylpropane-2-one, benzophenone, thioxanthone, 2,4,6-trimethylbenzoyldiphenylacyl phosphineoxide triphenylbutylborate tetraethylammonium and titanocene compounds expressed by the formulas below. These may be used alone or in combination of two or more, and may be combined with a sensitizing dye considering the wavelength of irradiating light.

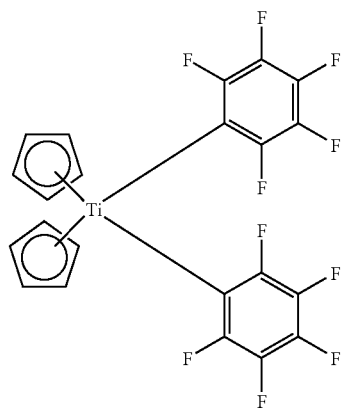

The photopolymer described above may be prepared by reaction of the monomer, the photoinitiator and the other components as required through stirring and mixing them. The resulting photopolymer, when being sufficiently of low viscosity, may be shaped by casting to prepare the recording layer. On the other hand, when being excessively viscous for the casting, the photopolymer is mounted on the second substrate by use of a dispenser, then the photopolymer is pressed by the first substrate in a manner that the first substrate covers the second substrate, thereby the photopolymer being spread entirely to form the recording layer.

The photorefractive material of (ii) described above may be properly selected depending on the purpose as long as the material exhibits the photorefractive effect; for example, the photorefractive material contains a charge generating material, a charge transporting material and other component as required.

The charge generating material may be properly selected depending on the purpose; examples thereof include phthalocyanine dyes such as metal phthalocyanines, non-metal phthalocyanines or derivatives thereof/pigments; naphthalocyanine dyes/pigments; azo dyes such as monoazo, disazo and triazo/pigments; perylene dyes/pigments; indigo dyes/pigments; quinacridone dyes/pigments; polycyclic quinone dyes such as anthraquinone and anthanthron/pigments; cyanine dyes/pigments; charge transfer complexes of electron acceptor substance and electron donor substance represented by TTF-TCNQ; azurenium salts; and fullerenes represented by $C_{60}$ and $C_{70}$ and demethafullerenes derived therefrom.

The charge transporting material, which performs to transport holes or electrons, may be a low molecular weight or polymer compound.

The charge transporting material may be properly selected depending on the purpose; examples thereof include nitrogen-containing cyclic compounds such as indole, carbazole, oxazole, isooxazole, thiazole, imidazole, pyrazole, oxadiazole, pyrazoline, thiadiazole, triazole and derivatives thereof; hydrazone compounds; triphenyl amines, triphenyl methanes, butadienes; stilbenes; quinone compounds such as anthraquinone and diphenylquinone or the derivatives; fullerenes represented by $C_{60}$ and $C_{70}$ and derivatives thereof; pi-conjugated polymers or oligomers such as polyacetylene, polypyrrole, polythiophene and polyaniline; sigma-conjugated polymers or oligomers such as polysilane and polygerman; polycyclic aromatic compounds such as anthracene, pyrene, phenanthrene and coronene. These may be used alone or in combination of two or more.

As for the process for forming the recording layer using the photorefractive material, for example, a coating liquid is prepared by dissolving or dispersing the photorefractive material in to a solvent, a coating film is formed using the coating liquid, and removing the solvent from the coating film thereby to prepare the recording layer. Alternatively, the coating film may be formed from the photorefractive material which being liquidized by heating, the coating film is then rapidly cooled to form the recording layer.

The photochromic material of (iii) described above may properly selected depending on the purpose as long as materials capable of causing a photochromic reaction; examples thereof include azobenzene compounds, stilbene compounds, indigo compounds, thioindigo compounds, spiropyran compounds, spirooxazine compounds, flukido compounds, anthracene compounds, hydrazone compounds and cinnamic compounds. Among these, particularly preferable are azobenzene derivatives and stilbene derivatives that undergo a structural change of cis-trans isomerization by light irradiation as well as spiropyran derivatives and spirooxazine derivatives that undergo a structural change of open or closed circular by light irradiation.

The chalcogen material (v) described above is, for example, a material that comprises a chalcogenide glass containing a chalcogen element and metal particles that is dispersed into the chalcogenide glass upon light irradiation.

The chalcogenide glass may be, without limitation, of nonoxidative amorphous material containing a chalcogen element of S, Te or Se and capable of optically doping the metal particles.

Examples of the aforementioned nonoxidative amorphous materials containing a chalcogen element include Ge—Se glasses, As—S glasses, As—Se glasses and As—Se—Ce glasses; among these, Ge—Se glasses are preferable. When the Ge—Se glasses are employed as the chalcogenide glass, the composition ratio of Ge/S may be optionally arranged depending on the wavelength of irradiated light; preferably, the chalcogenide glass has a composition expressed mainly by $GeS_2$.

The aforementioned metal particles may be properly selected depending on the purpose from those having the property to be optically doped into the chalcogenide glass by light irradiation; examples thereof include Al, Au, Cu, Cr, Ni, Pt, Sn, In, Pd, Ti, Fe, Ta, W, Zn and Ag. Among these, Ag, Au and Cu are preferable since the optical doping easily occurs, particularly preferable is Ag due to remarkable tendency to cause the optical doping.

The content of the metal particles dispersed into the chalcogenide glass is preferably 0.1 to 2% by volume based on the entire volume of the recording layer, more preferably 0.1 to 1.0% by volume. When the content of the metal particles is less than 0.1% by volume, the accuracy of the recording may be low due to insufficient transmissivity change by the optical doping, and when over 2% by volume, the optical doping hardly occurs in a sufficient level due to lowered optical transmissivity of the recording material.

The recording layer may be properly selected from conventional processes depending on the material; the preferable process for forming the layers is, for example, a vapor deposition process, wet film-forming process, MBE (molecular beam epitaxy) process, cluster ion beam process, molecular laminating process, LB process, printing process and transfer process. Among these, the vapor deposition process and wet film-forming process are preferable.

The vapor deposition process may be properly selected depending on the purpose from conventional ones; specific examples thereof include a vacuum vapor deposition process, resistance heating vapor deposition process, chemical vapor deposition process and physical vapor deposition process. The chemical vapor deposition process is exemplified more specifically by a plasma CVD process, laser CVD process, heat CVD process and gas source CVD process.

The recording layer may be formed by a wet film forming process, for example, in a manner that materials for the recording layer are dissolved and/or dispersed in a solvent to form a coating solution, then the coating solution is applied and dried. The wet film forming process may be properly selected depending on the purpose from conventional ones; examples thereof include an ink jet process, spin coating process, kneader coating process, bar coating process, blade coating process, casting process, dipping process and curtain coating process.

The thickness of the recording layer may be properly selected depending on the purpose; the thickness is preferably 1 to 1000 μm, more preferably 100 to 700 μm. When the thickness of the recording layer is within the preferable range, the sufficient S/N ratio may be attained even on the shift multiplex of 10 to 300; and the more preferable range may advantageously lead to more significant effect thereof.

First Substrate and Second Substrate

The first substrate and the second substrate may be properly selected depending on the purpose; for example, these substrates may be identical or different each other, preferably their shape and size are identical. In addition, the shape, configuration, size etc. may be properly selected depending on the purpose; the shape may be disc, card etc.; the shape and its material are required for the mechanical strength in terms of the optical recording media. In the case that the light for recording or reproducing is directed through the substrate, it is necessary that the substrate is sufficiently transparent at the wavelength region of the employed light.

The materials of the first and second substrates are each usually selected from glasses, ceramics, resins etc.; preferably, resins are employed in particular from the view point of formability and cost.

Examples of the resins include polycarbonate resins, acrylic resins, epoxy resins, polystyrene resins, acrylonitrile-styrene copolymers, polyethylene resins, polypropylene resins, silicone resins, fluorine resins, ABS resins and urethane resins. Among these, polycarbonate resins and acrylic resins are most preferable in view of their formability, optical characteristics and costs. The first and second substrates may be freshly prepared or commercially available.

Multiple numbers of address-servo areas, i.e. addressing areas linearly extending in the radial direction of the substrate, are provided on the second substrate at given angles to one another, and each sector form area between adjacent address-servo areas serves as a data area. In the address-servo areas, information for performing a focus servo operation and a tracking servo operation by means of a sampled servo system and address information are previously recorded (or preformatted) in the form of emboss pits (servo pits). The focus servo operation can be performed using a reflective surface of the reflective film. For example, wobble pits are used as the information for tracking servo. Note that there is no need to provide the servo pit pattern in a case where the optical recording medium is card-like shape.

The thickness of the first and second substrates may be properly selected depending on the purpose; the thickness is preferably 0.1 mm to 5 mm, more preferably 0.3 mm to 2 mm. When the thickness of the substrate is less than 0.1 mm, the optical disc may be deformed during its storage; and when the thickness is more than 5 mm, the weight of the optical disc may be as heavy as excessively loading on the drive motor.

Reflective Film

The reflective film is formed on the surface of the servo pit pattern of the second substrate. As for the material of the reflective film, such material is preferable that provides the recording light reference light with high reflectivity. When the wavelength of light to be adopted is 400 nm to 780 nm, Al, Al alloys, Ag, Ag alloys and the like are preferably used. When the wavelength of light to be adopted is 650 nm or more, Al, Al alloys, Ag. Ag alloys, Au, Cu alloys, TiN and the like are preferably used.

By use an optical recording medium e.g. DVD (digital video disc) which can reflect light by a reflective film and also can record or erase information, such directory information can be recorded and erased without adversely affecting holograms as those indicative of the locations where information has been recorded, the time when information has been recorded, and the locations where errors have occurred and how information has been re-recorded on spare areas.

The process for forming the reflective film may be properly selected depending on the purpose; examples thereof include various types of vapor deposition, such as a vacuum vapor deposition, sputtering, plasma CVD, photo CVD, ion plating, and electron beam vapor deposition. Among these, sputtering is most preferable in view of mass productivity, film quality, and the like. The thickness of the reflective film is preferably 50 nm or more, more preferably 100 nm or more, in order to secure sufficient reflectivity.

Other Layer

The other layers described above may be properly selected depending on the purpose; examples thereof include a first gap layer and a second gap layer.

First Gap Layer

The first gap layer is provided between the filter layer and the reflective film as required for smoothing the surface of the second substrate. Moreover, the first gap layer is effective to adjust the size of the hologram formed in the recording layer. Specifically, a gap layer between the recording layer and the servo pit pattern may be effective, since the recording layer requires the interference region of some larger size between the recording reference light and the informing light.

The first gap layer can be formed by, for example, applying UV curable resin etc. on the servo pit pattern by spin coating etc. and by curing the resin. In addition, when a filter layer is formed on a transparent substrate, the transparent substrate also serves as the first gap layer. The thickness of the first gap layer may be properly selected depending on the purpose; the thickness is preferably 1 to 100 μm.

Second Gap Layer

The second gap layer may be provided between the recording layer and the filter layer as required. In the case that the photopolymer fills the points where the informing light and the reference light focus, multiple recording capacity may be lowered when exposure is excessively carried out due to excessive consumption of the monomer, thus the second gap layer may perform to prevent the problem.

The material for the second gap layer may be properly selected depending on the purpose; examples thereof include transparent resin films such as triacetylcellulose (TAC), polycarbonate (PC), polyethylene terephthalate (PET), polystyrene (PS), polysulfone (PSF), polyvinylalcohol (PVA) and methyl polymethacrylate (PMMA); norbornene resin films such as ARTON (product name, by JSR Corp.), ZEONOA (product, by Nippon Zeon). Among these, those with high isotropy are preferable, and TAC, PC, ARTON and ZEONOA are most preferable.

The thickness of the second gap layer may be properly selected depending on the purpose; the thickness is preferably 1 μm to 200 μm.

The optical recording media will be explained in more detail with reference to figures in the following.

First Operative Example

Figure 1:
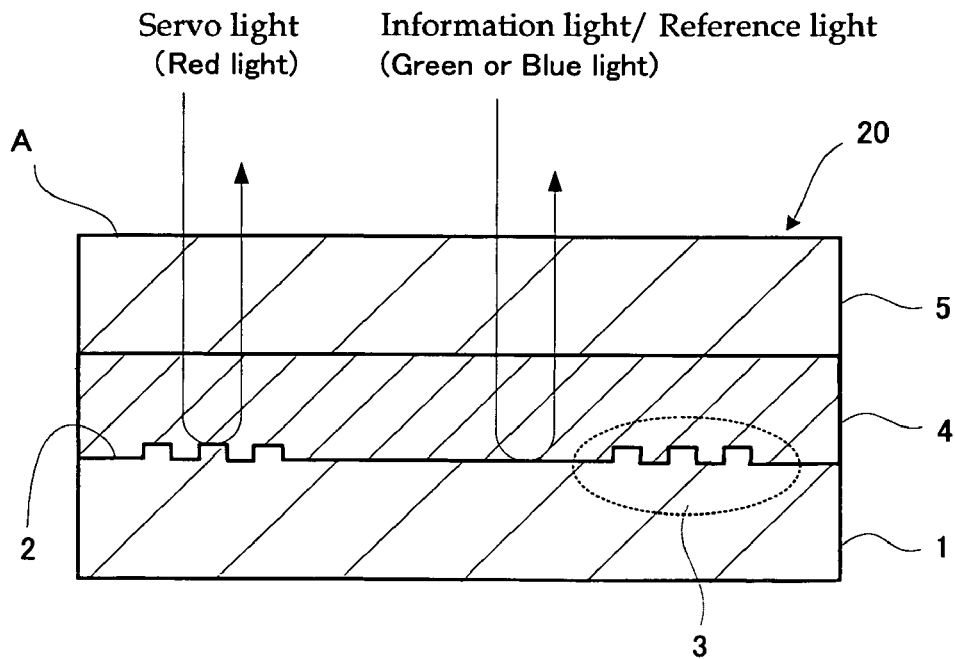
FIG. 1 is a schematic cross section that shows a configuration of a conventional optical recording medium.
Figure 2:
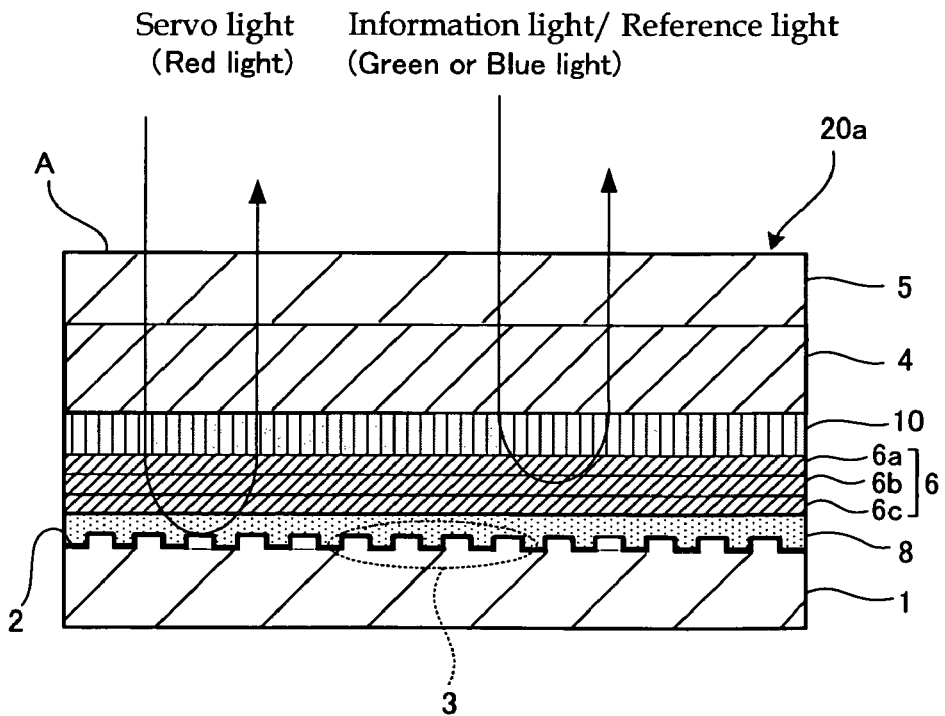
FIG. 2 is a schematic cross section that shows a configuration of an optical recording medium having a conventional filter layer.
Figure 3:
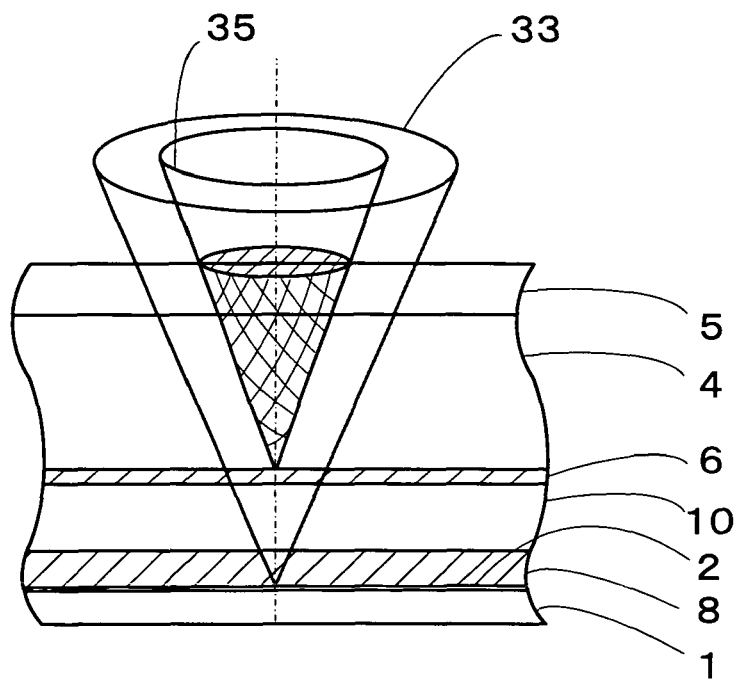
FIG. 3 is a conceptual view that explains irradiation of an informing light and a servo light in optical recording media.
Figure 4:
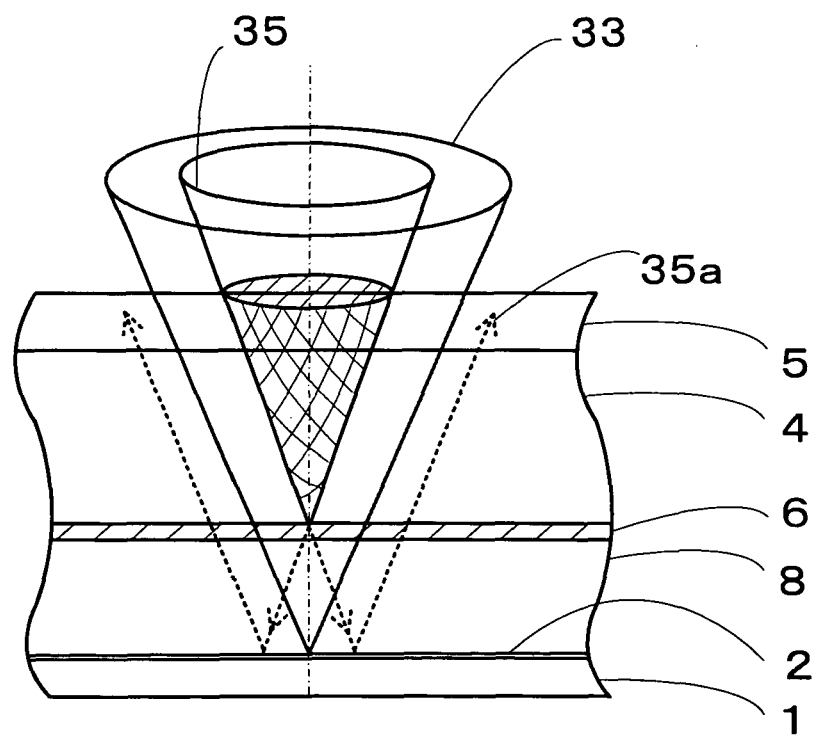
FIG. 4 is a conceptual view that explains optical reflection in conventional optical recording media.
Figure 7:
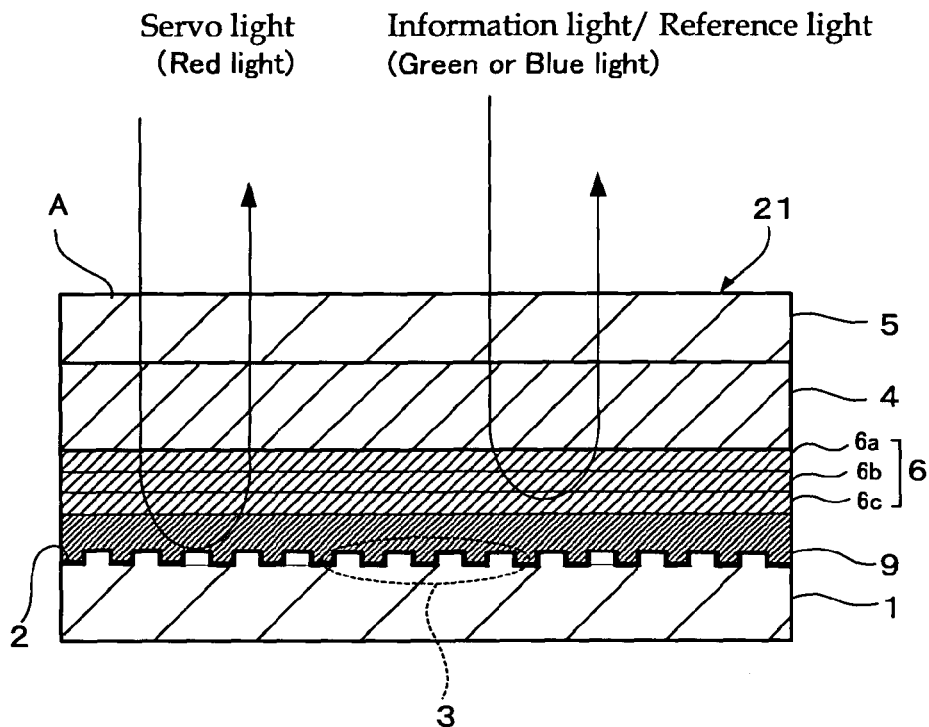
FIG. 7 is an exemplary schematic cross section that shows the optical recording medium according to the first Operative Example of the present invention.

FIG. 7 is a schematic cross-sectional view showing the structure of the first Operative Example of the optical recording medium in the present invention. In the optical recording medium 21 according to the first Operative Example, servo pit pattern 3 is formed on the second substrate 1 made of a polycarbonate resin or glass, and the servo pit pattern 3 is coated with Al, Au, Pt or the like to form reflective film 2. Although the servo pit pattern 3 is formed on the entire surface of the second substrate 1 in FIG. 7, it may be formed on the second substrate 1 periodically as shown in FIG. 1. In addition, the height of the servo pit pattern 3 is 1750 angstroms (175 nm) at maximum, which being significantly smaller than those of the other layers including the second substrate.

The optical absorption layer 9 is formed by way of coating a material of screen printing ink etc. on the reflective film 2 of the second substrate 1 by screen printing and spin coating etc.

The filter layer 6 is provided on the optical absorption layer 9, and the recording layer 4 is provided on the filter layer 6; the optical absorption layer 9, filter layer 6 and recording layer 4 are sandwiched between the first substrate 5 and the second substrate 1 (polycarbonate resin substrate or glass substrate) thereby to constitute the optical recording medium 21.

In FIG. 7, the filter layer 6 transmits only red light and blocks other color lights. Since the informing light, recording light and reproduction reference light are of green or blue, they do not pass through the filter layer 6 instead turn into a return light to emit from the entrance/exit surface A without reaching the reflective film 2.

The filter layer 6 is constituted of a laminated body formed by laminating three cholesteric liquid crystal layers 6a, 6b and 6c. The filter layer 6 of the laminated body of the cholesteric liquid crystal layers may be directly formed on the optical absorption layer 9 by a coating process, or may be disposed by punching through the four layers of the cholesteric liquid crystal layers and the substrate into the optical disc shape. By virtue of laminating three layers of cholesteric liquid crystal, optical reflectivity of no less than 40% can be realized for wavelength range of $\lambda_0$ to $\lambda_0/\cos 20°$, especially $\lambda_0$ to $\lambda_0/\cos 40°$ (where $\lambda_0$ represents the wavelength of irradiation light), thereby the selective reflection wavelength may be far from shifting even when the incident angle being changed.

In this Operative Example where three layers of cholesteric liquid crystal layers 6a, 6b and 6c are formed, the reproduced image may be far from distortion, since the optical absorption layer 9 is formed between the second substrate 1 and the cholesteric liquid crystal layer 6c, and absorbs the informing light and the reference light which leaking from the cholesteric liquid crystal layer 6c.

The optical recording medium 21 of the first Operative Example may be of disc shape or card shape. The servo pit pattern is unnecessary where the optical recording medium 21 is a card shape. In the optical recording medium 21, the second substrate 1 is 0.6 mm thick, the optical absorption layer 9 is 100 µm thick, the filter layer 6 is 2 to 3 µm thick, the recording layer 4 is 0.6 mm thick, and the first substrate 5 is 0.6 mm thick, leading to the total thickness of about 1.93 mm.

Figure 6:
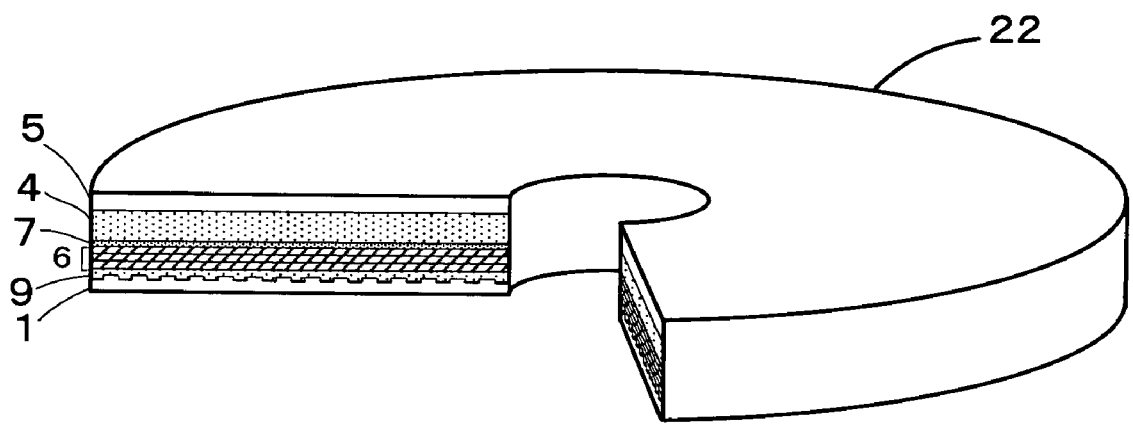
FIG. 6 is a perspective view of a partially cutaway optical recording medium according to the present invention.
Figure 8:
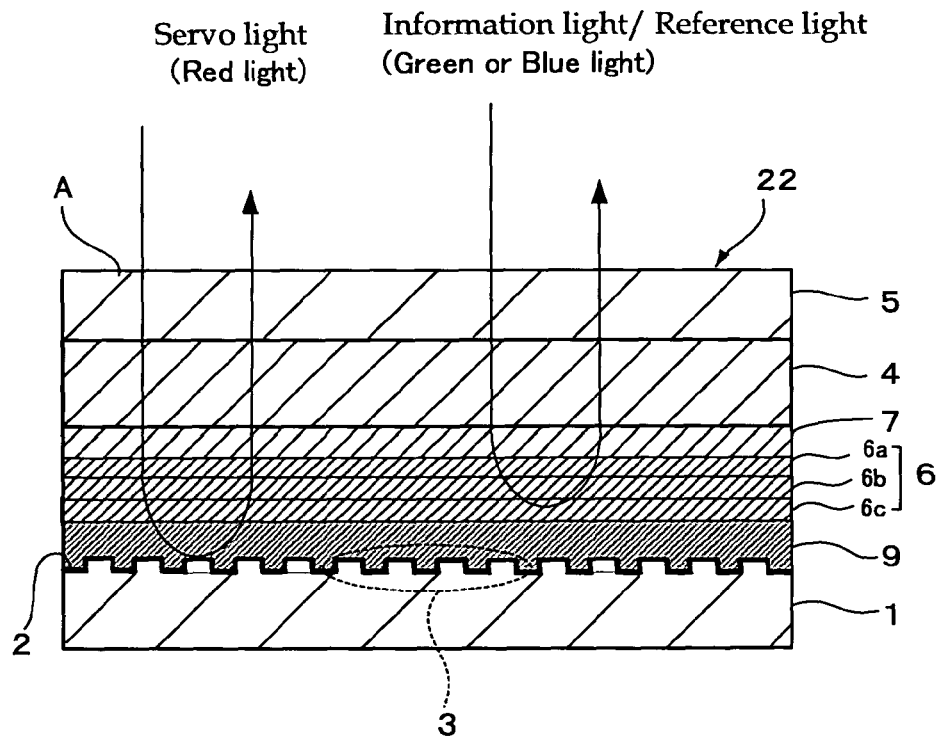
FIG. 8 is an exemplary schematic cross section that shows the optical recording medium according to the first Operative Example of the present invention.

The first Operative Example include the optical recording medium 22, as shown in FIGS. 6 and 8, where the second gap layer 7 is formed between the filter layer 6 and the recording layer 4. The second gap layer 7 is provided to prevent the decrease of multiple recording capacity due to excessive consumption of the monomer in the case that the photopolymer fills the points where the informing light and the reference light focus.

Figure 14:
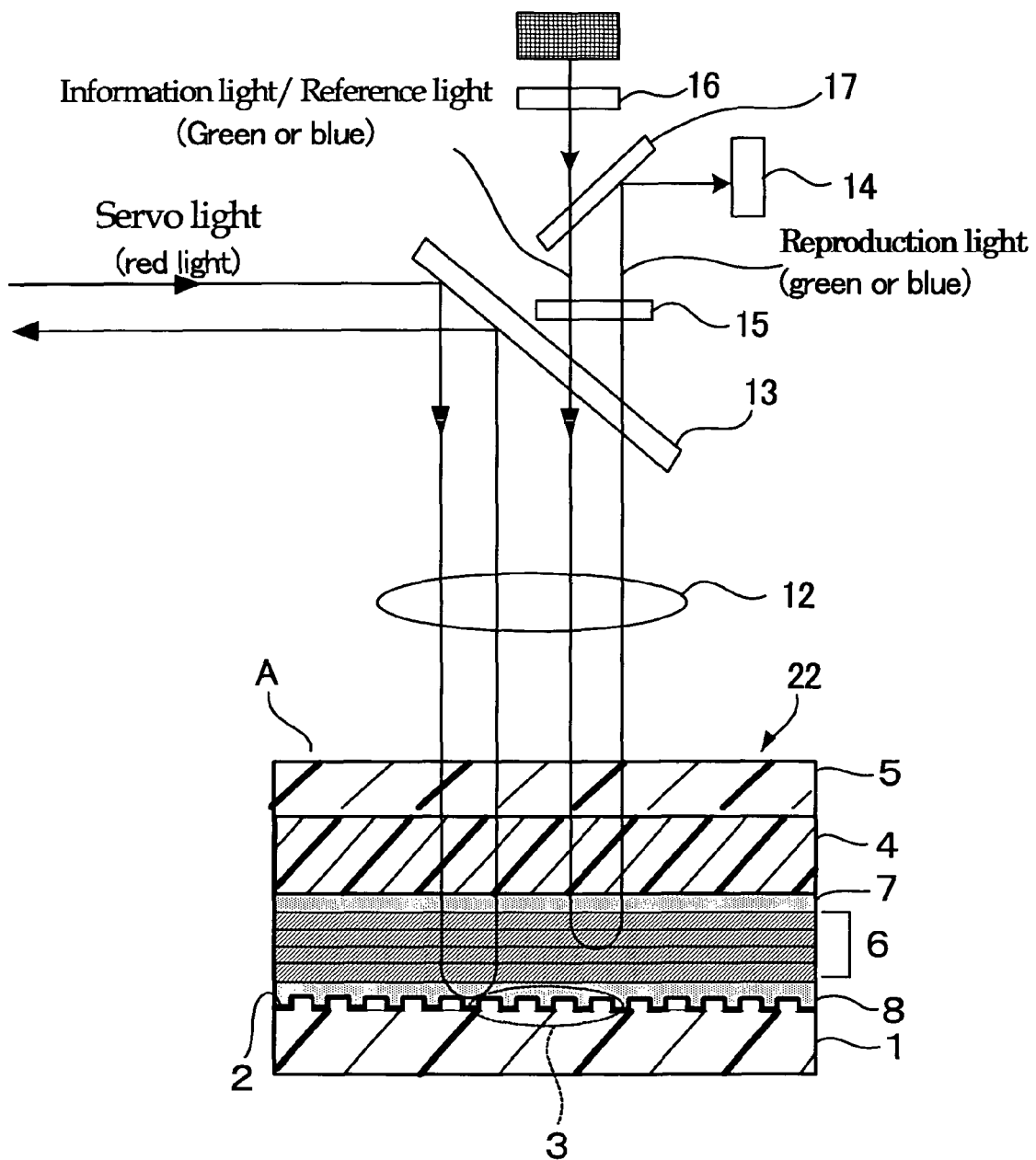
FIG. 14 is an explanatory view that shows exemplarily an optical system around an optical recording medium according to the present invention.

The optical operations around the optical recording medium 21 will be explained with reference to FIG. 14 in the following.

First, red light 10 emitted from the servo laser source is reflected by a dichroic mirror 13 by almost 100%, and passes through objective lens 12. The servo light 10 is applied onto the optical recording medium 21 in such a way that it focuses on the reflective film 2. More specifically, the dichroic mirror 13 is so configured that it transmits only green or blue light but reflects almost 100% of red light. The servo light incident from the light entrance/exit surface A of the optical recording medium 21 passes through the first substrate 5, recording layer 4, filter layer 6 and first gap layer 8, is reflected by the reflective film 2, and passes again through the first gap layer 8, filter layer 6, recording layer 4 and first substrate 5 to emit from the light entrance/exit surface A. The returning servo light passes through the objective lens 12 and is reflected by the dichroic mirror by almost 100%, and then a servo information detector (not shown) detects servo information in the returning servo light. The detected servo information is used for the focus servo operation, tracking servo operation, slide servo operation, and the like. The holographic material containing the recording layer 4 is designed so as not to be sensitive to red light. For this reason, even when the servo light has passed through the recording layer 4 or has been reflected diffusively by the reflective film 2, the recording layer 4 is not adversely affected. In addition, the returning servo light that has been reflected by the reflective film 2 is reflected almost 100% by the dichroic mirror 13; accordingly, the servo light is non-detectable by CMOS sensor or CCD 14 used for the detection of reconstructed images, thus providing the diffracted light with no noise.

With respect to the reflection range of $\lambda_0$ to $1.3\lambda_0$, $1.3\lambda_0$ shown in FIG. 10, $1.3\lambda_0$ equals to 692 nm when $\lambda_0$ is 532 nm, and thus a servo light of wavelength 655 nm is undesirably reflected. This reflection range is set in view of light incident at an angle of ±40°. When such light inclined at larger angles is used, a servo operation can be performed with no problem by using a servo light incident at an angle of within ±20° that has been masked. In addition, by securing larger helical pitch in the cholesteric liquid crystal layer in the filter layer used, it is also possible to readily cover a servo light incident to the filter layer at an angle of within ±20°. In that case, it is only necessary to laminate two cholesteric liquid crystal layers of $\lambda_0$ to $1.1\lambda_0$ as shown in FIG. 12, thus there exists no problem to transmit the servo light.

Both of the informing light and recording reference light emitted from the recording/reproducing laser source pass through the polarizing plate 16 to form a linear polarization then to form a circular polarization when passing through the half mirror 17 and the quarter wave plate 15. The circular polarization then passes through the dichroic mirror 13, and illuminates the optical recording media 21 by action of the objective lens 12 in a manner that the informing light and the reference light create an interference pattern in the recording layer 4. The informing light and reference light enter from the light entrance/exit surface A and interact with each other in the recording layer 4 to form an interference pattern. Thereafter, the informing light and reference light enters into the recording layer 4 and the filter layer 6, and then, are reflected to turn into a return light before reaching the bottom of the filter layer 6. That is, the informing light and recording reference light do not reach the reflective film 2. This is because the filter layer 6, formed of three-layer laminate of cholesteric liquid crystal layers, transmits exclusively red light. Provided that a part of light leaks and transmits through the filter layer 6, the leaked light may be absorbed by the optical absorption layer 9, therefore, a diffracted light may be obtained with high quality without including the leaked light. In the first Operative Example, the second gap layer 7 may be effectively provided between the recording layer 4 and the filter layer 6. The second gap layer 7 may prevent the problem that the multiple recording capacity being lowered due to excessive consumption of the monomer under excessive exposure in the case that the photopolymer fills the points where the informing light and the reference light focus.

Second Operative Example

Figure 9:
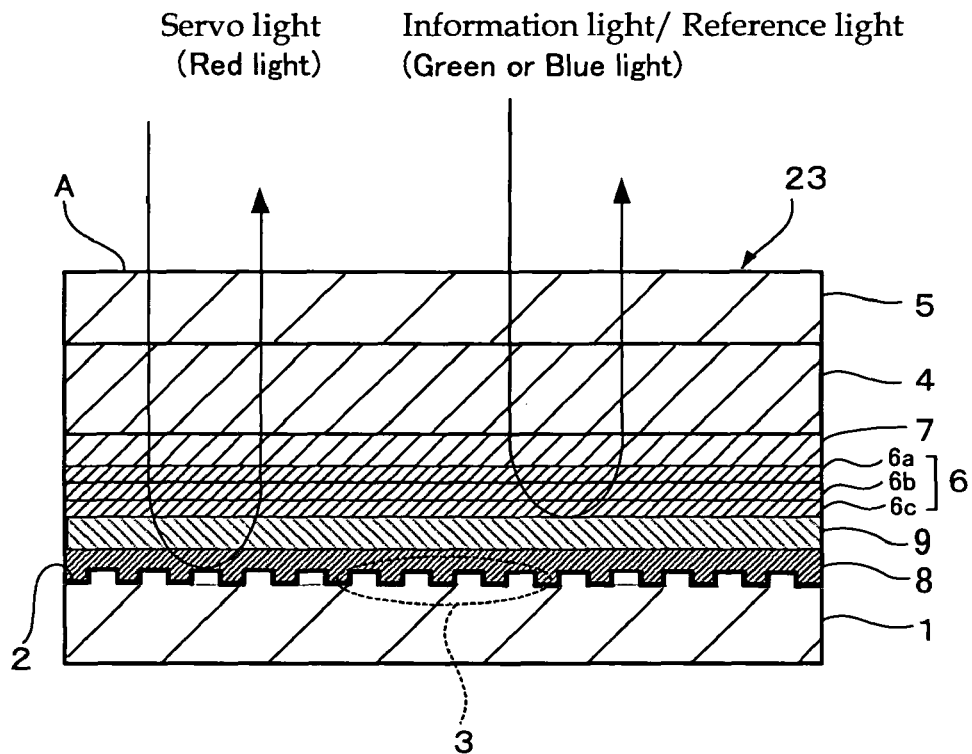
FIG. 9 is an exemplary schematic cross section that shows the optical recording medium according to the second Operative Example of the present invention.

FIG. 9 is a schematic cross-sectional view showing the configuration of the second Operative Example of the inventive optical recording medium. In the optical recording medium 23 of the second Operative Example, servo pit pattern 3 is formed on the second substrate 1 made of polycarbonate resin or glass, and the servo pit pattern 3 is coated with Al, Au, Pt or the like to form the reflective film 2. The height of the servo pit pattern 3 is usually 1750 angstroms (175 nm), which being similar with the first Operative Example.

The difference between the first Operative Example and the second Operative Example is that the first gap layer 8 is disposed between the second substrate 1 and the filter layer 6 and the optical absorption layer 9 is formed between the first gap layer 8 and the filter layer 6 in the optical recording medium 23 of the second Operative Example. More specifically, the difference is that the first gap layer 8 entirely corresponds to the optical absorption layer 9 in first Operative Example, and the first gap layer 8 partly corresponds to the optical absorption layer 9 in second Operative Example, The filter layer 6 of three-layer laminated body of cholesteric liquid crystal layers, which may be similar with that of the first Operative Example described above, is formed on the optical absorption layer 9 after forming the first gap layer 8 and then the optical absorption layer 9 is formed on the first gap layer 8.

In the second gap layer 7, there is a point at which both of the informing light and the reference light focus as described above. When this area around the point embedded by the photopolymer, excessive exposure takes places and thus an excess amount of monomers are consumed, leading to poor multiplexing recording capacity. Consequently, the non-reactive transparent second gap layer may be effectively provided.

In the optical recording medium 23, the second substrate 1 is 1.0 mm thick, the first gap layer 8 is 90 μm thick, the optical absorption layer 9 is 10 μm thick, the filter layer 6 is from 3 to 5 μm thick, the second gap layer 7 is 100 μm thick, the recording layer 4 is 0.6 mm thick, the first substrate 5 is 0.4 mm thick, and the total thickness is about 2.22 mm.

Upon recording and reproducing information, the optical recording medium 23 having the structure described above is irradiated with a red servo light and a green informing light as well as a recording light and a reproducing reference light. The servo light enters from the light entrance/exit surface A, passes through the recording layer 4, the second gap layer 7, the filter layer 6, the optical absorption layer 9 and the first gap layer 8, and is reflected by the reflective film 2 to turn into a return light. This return light sequentially passes through the first gap layer 8, the optical absorption layer 9, the filter layer 6, the second gap layer 7, the recording layer 4 and first substrate 5, and emits from the light entrance/exit surface A. The emitted return light is utilized for the focus servo operation, tracking servo operation and the like. The hologram material of the recording layer 4 is designed to be non-sensitive to red light; therefore, the recording layer 4 receives no influence even when the servo light has passed through the recording layer 4 or has been reflected diffusively by the reflective film 2. The green informing light and the reference light etc. enter from the light entrance/exit surface A, then pass through the recording layer 4 and second gap layer 7, and reflected by the filter layer 6 to tern into a return light. The return light sequentially passes through the second gap layer 7, the recording layer 4 and first substrate 5 again, and emits from the light entrance/exit surface A. Upon reproduction of information, both of the reproducing reference light and the diffracted light generated by irradiating the reproducing reference light onto the recording layer do not reach the reflective film 2 and emit from the light entrance/exit surface A. The optical operations around the optical recording medium 23 (i.e. the objective lens 12, filter layer 6, CMOS sensor or CCD 14 of detector in FIG. 14) are similar to those in Operative Example 1 (FIG. 11), thus the description thereof will be omitted.

Method of Producing Optical Recording Medium

The inventive method of producing an optical recording medium, which produces the inventive optical recording media described above, comprises at least a step of laminating an optical absorption layer and a step of forming a filter layer, and also a step of forming a reflective film, a step of forming a recording film and other optional steps as required.

Step of Laminating Optical Absorption Layer

An optional absorption layer is laminated on a second substrate by coating a material for the optional absorption layer, in the step of laminating an optical absorption layer. When a reflective film is formed on the second substrate, the optional absorption layer is laminated on the reflective film. When a first gap layer is formed on the second substrate, the optional absorption layer is laminated on the first gap layer.

The coating process may be properly selected depending on the purpose; for example, the process may be similar with those for coating the recording layer or cholesteric layer described above. The coating liquid for the coating process may be inks for screen printing (e.g. magenta, by Dainippon Ink and Chemicals, Inc.). The material of the optional absorption layer may be those discussed above in the optical recording media.

Step of Forming Filter Layer

A filter layer of a laminated body is prepared in the step of forming a filter layer by laminating at least one of the dichroic mirror layer, color material-containing layer, dielectric vapor deposition layer, cholesteric layer etc. described above on the optical absorption layer.

It is preferred in the step of forming a filter layer from the viewpoint of productivity that the inventive filter for optical cording media is processes into the shape of an optical recording medium, and the resulting filter is laminated to the optical absorption layer to form the filter layer.

The shape of the optical recording medium may be properly selected depending on the purpose; for example, the shape may be disc-like or card-like.

The method for processing the filter into a shape of the optical recording medium may be may be properly selected depending on the purpose; such processes may be employed as a cutting process with a press cutter, stamping process with a stamping cutter and burning-out process with a laser cutter.

In carrying out the lamination, for example, the filter is laminated to the substrate using an adhesive or tackiness agent in a manner that no air is trapped therebetween.

The adhesive may be properly selected depending on the purpose; examples thereof include UV curable adhesives, emulsion adhesives, one-component curable adhesives and two-component curable adhesives. These conventional adhesives may also be employed in appropriate combination of two or more.

The tackiness agent may be properly selected depending on the purpose; examples thereof include rubber agents, acrylic agents, silicone agents, urethane agents, vinylalkyl ether agents, polyvinylalcohol agents, polyvinylpyrrolidone agents, polyacrylamide agents and cellulose agents.

The method for the laminating various cholesteric liquid crystal layers may be properly selected from conventional ones depending on the purpose; preferable methods are, for example, (i) respective cholesteric liquid crystal layers each prepared independently are laminated using an adhesive or tackiness agent; (ii) respective cholesteric liquid crystal layers each prepared independently are laminated by means of heating and pressing; (iii) respective cholesteric liquid crystal layers each prepared independently are laminated by means of compatibility at interface area; (iv) a cholesteric liquid crystal layer is formed by a coating process, onto which another cholesteric liquid crystal layer is then formed by a coating process; (iv) a cholesteric liquid crystal layer is formed on a transparent substrate, onto which a polyvinyl alcohol film is formed and followed by a rubbing step, then a cholesteric liquid crystal layer is formed and followed by treatment for orienting and aging. Among these, the method of (v) is preferable in particular from the viewpoint of productivity and cost.

The adhesive or tackiness agent, in the laminating method of (i) described above, may be properly selected depending on the purpose; examples thereof include UV curable adhesives and acrylic tackiness agents. The thickness of the adhesive or tackiness agent may be properly selected depending on the purpose; from the viewpoint of optical properties and demands for thinning, the thickness of the adhesive is preferably 0.1 to 10 µm, more preferably 0.1 to 5 µm and the thickness of the tackiness agent is preferably 0.1 to 50 µm, more preferably 2 to 30 µm.

As for the laminating method (ii) described above, the methods of heating and pressing may be, for example, heat-sealing processes, ultrasonic processes, impulse-sealing processes and radiofrequency weld processes.

As for the laminating method (iii) described above, for example, the method for generating the compatibility is carried out by coating a solvent capable of dissolving or swelling slightly the cholesteric liquid crystal layer thereby inducing the compatibility at the interface.

Examples of the solvents, capable of dissolving or swelling slightly the cholesteric liquid crystal layer, include aromatic compounds such as toluene, benzene and xylene; alcohols such as methanol, ethanol and isopropyl alcohol; cyclic hydrocarbons such as cyclohexane and cyclopentane; ketones such as acetone and methylethylketone (MEK); ethers such as isopropylether; esters such as ethyl acetate; and chlorine-containing solvents such as chloroform and dichloro methane; among these, particularly preferable are toluene, cyclohexane, cyclopentane, MEK and isopropyl alcohol.

As for the laminating method (iv) described above, the coating processes described above may also be employed properly depending on the purpose; examples thereof include inkjet processes, spin coating processes, kneader coating processes, bar coating processes, die coating processes, blade coating processes, casting processes, dipping processes and curtain coating processes.

The cholesteric liquid crystal layer may be formed appropriately by the coating process, for example, in a way that the material of the cholesteric liquid crystal layer and a solvent are employed to prepare a solution of the coating liquid, then the coating liquid is coated and dried.

When the coated layer is UV-cured depending on requirements, the condition may be properly selected depending on the purpose; for example, the UV-rays are preferably 160 to 380 nm, more preferably 250 to 380 nm. The exposure time is preferably 10 to 600 seconds, more preferably 10 to 300 seconds when the illumination intensity is 10 mW/cm$^2$, for example. Even when the illumination intensity is lowered to 10 mW/cm$^2$, for example, the exposure time may be substantially the same provided that the reaction initiator is increased as a conventional way, thus the exposure time may be preferably 10 to 600 seconds, more preferably 10 to 300 seconds, for example.

In the laminating method of (v) described above, the material of the transparent substrate may be inorganic or organic materials. Examples of the inorganic materials include glasses, quartz glass and silicon. Examples of the organic materials include acetate resins such as triacetylcellulose, polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinylalcohol resins, polyvinylchloride resins, polyvinilidenechloride resins and polyacrylic resins. These may be used alone or in combination of two or more.

In the step of forming a reflective film described above, the reflective film is formed on the second substrate; the details of the materials and forming processes are the same as those explained for the optical recording media.

In the step of forming a recording layer described above, the recording layer is formed on the filter layer; the details of the materials and forming processes are the same as those explained for the optical recording media.

Optical Recording Method and Optical Reproducing Method

In the optical recording method according to the present invention, the informing light and the reference light are irradiated as a co-axial luminous flux, then the interference pattern formed by the interference of the informing light and the reference light is made use of recording the information on the recording layer.

In the optical reproducing method according to the present invention, a reproducing light is irradiated onto the interference pattern of the recording layer which is recorded by the optical recording method according to the present invention.

In the optical recording method and the optical reproducing method according to the present invention, the informing light with a two-dimensional intensity distribution and the reference light with almost the same intensity to that of the informing light are superimposed inside the photosensitive recording layer, the resulting interference pattern formed inside the recording layer induces a distribution of the optical properties of the recording layer to thereby record such distribution as an information. On the other hand, when the recorded information is to be read (reproduced), only the reference light is irradiated onto the recording layer from the same direction to that irradiated at the time of recording, a light having a intensity distribution corresponding to the distribution of the optical property formed inside the recording layer is emitted from the recording layer as a reproducing light.

The optical recording method and the optical reproducing method according to the present invention may be carried out by use of the optical recording and reproducing apparatus explained below.

The optical recording and reproducing apparatus applied to the optical informing method and the optical reproducing method will be explained with reference to FIG. 15.

Figure 15:
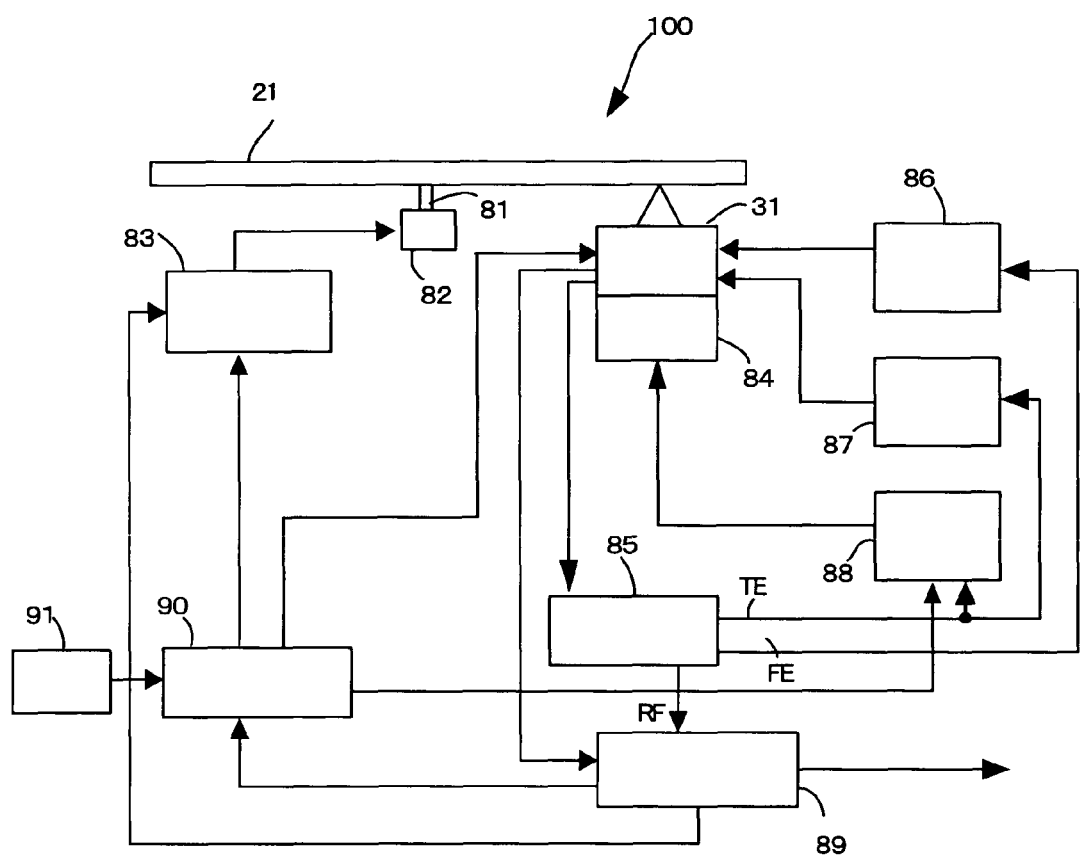
FIG. 15 is a block diagram that shows exemplarily an entire construction of an optical recording and reproducing apparatus according to the present invention.

FIG. 15 is an exemplary block flowchart showing the whole mechanism of the optical recording and reproducing apparatus according to the present invention. The optical recording and reproducing apparatus contains both of the optical recording apparatus and the optical reproducing apparatus.

This optical recording and reproducing apparatus 100 is equipped with spindle 81 on which the optical recording medium 21 is deposed, spindle motor 82 which rotates the spindle 81, and spindle servo circuit 83 which controls the spindle motor 82 so as to maintain the optical recording medium 21 at the predetermined revolution number.

The optical recording and reproducing apparatus 100 is also equipped with pickup unit 31 which irradiates the informing light and the reference light onto the optical recording medium so as to record an information, and irradiates the reproducing reference light onto the optical recording medium 21 so as to detect the diffracted light to thereby reproduce the information recorded at the optical recording medium 21, and driving unit 84 which enables the pickup unit 31 to move in the radius direction of optical recording medium 21.

The optical recording and reproducing apparatus 100 is equipped with detecting circuit 85 which detects focusing error signal FE, tracking error signal TE, and reproducing signal RF from the output signal of the pickup unit 31, focusing servo circuit 86 which drives an actuator in the pickup unit 31 so as to move an objective lens (not shown in FIG. 15) to the thickness direction of the optical recording medium 21 based upon the focusing error signal FE detected by the detecting circuit 85 to thereby perform focusing servo, a tracking servo circuit 87 which drives an actuator in the pickup unit 31 so as to move an objective lens (not shown in FIG. 15) to the thickness direction of the optical recording medium 21 based upon the tracking error signal TE detected by the detecting circuit 85 to thereby perform tracking servo, and a sliding servo unit 88 which controls the driving unit 84 based upon the tracking error signal TE and an indication from a controller mentioned hereinafter so as to move the pickup unit 31 to the radius direction of the optical recording medium 21 to thereby perform sliding servo.

The optical recording and reproducing apparatus 100 is also equipped with signal processing circuit 89 which decodes output data of the CMOS or CCD array described below in the pickup unit 31, to thereby reproduce the data recorded in the data area of the optical recording medium 21., and to reproduce the standard clock or determines the address based on the reproducing signal RF from the detecting circuit 85, controller 90 which controls the whole optical recording and reproducing apparatus 100, and controlling unit 91 which gives various instructions.

The controller 90 is configured to input the standard clock or address information outputted from the signal processing circuit 89 as well as controlling the pickup unit 31, the spindle servo circuit 83, the sliding servo circuit 88 and the like. The spindle servo circuit 83 is configured to input the standard clock outputted from the signal processing circuit 89. The controller 90 contains CPU (center processing unit), ROM (read only memory), and RAM (random access memory), the CPU realizes the function of the controller 90 by executing programs stored in the ROM on the RAM, a working area.

The optical recording and reproducing apparatus, applicable for the optical informing method and the optical reproducing method, is equipped with the optical recording media according to the present invention, therefore, may prevent diffuse reflection of the informing light and the reference light from the reflective film of the optical recording medium and also prevent noise generation without the sift of selective reflection wavelength even if the incident angle being altered since the optical absorption layer absorbs the light leaked from the filter layer; consequently higher density recording may be attained than ever before.

EXAMPLES

The present invention will be explained with reference to Examples, which are given for no more than illustration of the invention rather than for limiting its intended scope.

Example 1

Preparation of Filter for Optical Recording Medium

A filter was prepared as a filter for optical recording media, which consisting of a dielectric vapor deposition layer formed by laminating alternatively plural layers of a dielectric thin layer having a higher refractive index and a dielectric thin layer having a lower refractive index.

The material of the dielectric thin layer having a higher refractive index was $TiO_2$, the material of the dielectric thin layer having a lower refractive index was $TiO_2$; nine layers of these materials were alternatively laminated as $TiO_2/SiO_2/TiO_2/SiO_2/TiO_2/SiO_2/TiO_2/SiO_2/TiO_2$ by means of DC oxygen reactive sputtering. Each of the layers was 532 nm/4n, in which "n" being 2.5 in $TiO_2$ and 1.5 in $SiO_2$.

Evaluation of Optical Reflective Property

The resulting filter for optical recording media was determined in terms of the optical reflective property using a spectral reflection meter (optical source: L-5662 by Hamamatsu Photonics K.K., photo multichannel analyzer: PMA-11 by Hamamatsu Photonics K.K.). The results demonstrate that the filters for optical recording media can reflect 40% or more of the light of 532 nm which is the selective wavelength for the light with an incident angle of ±20°.

Preparation of Optical Recording Medium

The second substrate was of a polycarbonate resin having a diameter of 120 mm and a plate thickness of 0.6 mm, which being a conventional substrate utilized for DVD-RW. Servo pit patterns were formed on the entire surface of the substrate, the track pitch was 0.74 μm, the groove depth was 175 nm and the groove width was 300 nm.

A reflective film was firstly formed on the surface of the servo pit pattern of the second substrate. Aluminum (Al) was utilized for the material of the reflective film. The film was coated by DC magnetron spattering process thereby Al reflective film of 200 nm thick was formed.

Then a first gap layer of a polycarbonate film having a thickness of 90 μm was adhered on the reflective film by use of a UV curable resin. On the first gap layer, a material for the optical absorption layer of UV printing ink (DAICURE SSD TF106 PINK, by Dainippon Ink and Chemicals, Inc.) base on Magenta Clear was coated by a screen printing machine thereby to laminate an optical absorption layer of 10 μm thick.

The informing light and the reference light in recording information, and the reproducing light (first light) for the reproduction were of wavelength 532 nm, and the servo light (second light) was of 650 nm wavelength; the transmissivities of the first and second lights at the optical absorption layer are shown in Table 1. These transmissivities were measured by UV130 (by Shimadzu Co.).

The resulting filter for optical recording media was punched into a disc size so as to allow being disposed on the substrate, then was laminated with locating the face of the base film on the side of the optical absorption layer. The lamination was carried out by use of a UV curable resin or tackiness agent while taking care of no air being trapped therebetween, thereby the filter layer was formed.

Preparation of Photopolymer Coating Liquid

The Photopolymer coating liquid was prepared for the material of the recording liquid in accordance with the composition shown below:

| | |
|---|---|
| di(urethane acrylate) oligomer[1] | 59 parts by mass |
| isobornyl acrylate | 30 parts by mass |
| vinyl benzoate | 10 parts by mass |
| polymerization initiator[2] | 1 part by mass |

[1] ALU-351, by Echo Resins Co.
[2] IRGACURE 784, by Ciba Specialty Chemicals

The resulting photopolymer coating liquid is mounted on the filter layer by use of a dispenser; the disc edge and the first substrate, having a diameter of 12 cm and a thickness of 0.6 mm made of a polycarbonate resin, were laminated by an adhesive while pressing the first substrate to the photopolymer. In addition, a flange is provided at the disc edge such that the photopolymer layer is adjusted 500 μm thick, the thickness of the photopolymer layer is defined by adhering the first substrate to the flange, i.e. too much photopolymer overflowed and abandoned itself. The optical recording medium was prepared in accordance with the procedures described above. FIG. 7 is an exemplary schematic cross section showing similar configuration with this Example.

Property Evaluation

The resulting optical recording medium was installed to the optical recording and reproducing apparatus as shown in FIG. 15 and was recorded and reproduced actually, then was evaluated in terms of the error number (number/flame) within reproduced images. The results were shown in Table 1.

Example 2

The optical recording medium of Example 2 was prepared and evaluated in the same manner as Example 1 except that the optical absorption layer was 5 μm thick and the first gap layer was 95 μm thick. The results were shown in Table 1.

Example 3

The optical recording medium of Example 3 was prepared and evaluated in the same manner as Example 1 except that the optical absorption layer was 20 μm thick and the first gap layer was 80 μm thick. The results were shown in Table 1.

Example 4

The optical recording medium of Example 4 was prepared and evaluated in the same manner as Example 1 except that the optical absorption layer was 3 μm thick and the first gap layer was 10 μm thick. The results were shown in Table 1.

Comparative Example 1

The optical recording medium of Comparative Example 1 was prepared and evaluated in the same manner as Example 1 except that no optical absorption layer was formed and the first gap layer of 10 μm thick was solely formed. The results were shown in Table 1.

may provide high-quality reproducing images with extremely less errors and noise generation and without distortion compared to Comparative Example 1.

The present invention may solve previous problems in the art, that is, the present invention may provide optical recording media of hologram type capable of high-density recording and capable of preventing noise even when the informing light and the reference light leak from filter layers formed of wavelength-selective reflection films, methods of producing the optical recording media with higher efficiency and lower cost, as well as optical recording methods and optical reproducing methods that utilize the optical recording media.

The optical recording media according to the present invention may be applied widely as various optical recording media of hologram type capable of high-density recording and capable of preventing noise even when the informing light and the reference light leak from filter layers formed of wavelength-selective reflection films.

The inventive methods of producing an optical recording medium may be utilized for methods of producing various optical recording media of hologram type capable of high-density recording and capable of preventing noise over the prior art.

The optical recording methods according to the present invention may be applied appropriately for methods of recording various optical recording media of hologram type capable of high-density recording and capable of preventing noise over the prior art.

The optical reproducing methods according to the present invention may be applied appropriately for methods of reproducing various optical recording media of hologram type capable of high-density recording and capable of preventing noise over the prior art.

What is claimed is:

1. An optical recording medium, comprising:
a first substrate, a recording layer, a filter layer, an optical absorption layer and a second substrate in this order,
wherein the recording layer records information by use of holography,
the optical absorption layer comprises any one of dyes and pigments which absorb a light having a wavelength within 350 nm to 600 nm and which transmit a light having a wavelength within 600 nm to 655 nm,
a gap layer is provided between the optical absorption layer and the second substrate, wherein the gap layer is formed on a reflective film formed on the second substrate, and

TABLE 1

|  | Thickness of Optical Absorption Layer (μm) | Thickness of First Gap Layer (μm) | Transmissivity at First Light Wavelength (%) | Transmissivity at Second Light Wavelength (%) | Error Number (Number/Flame) |
| --- | --- | --- | --- | --- | --- |
| Example 1 | 10 | 90 | 2 | 85 | 1 |
| Example 2 | 5 | 95 | 4 | 86 | 1 |
| Example 3 | 20 | 80 | 1 | 84 | 1 |
| Example 4 | 3 | 10 | 7 | 78 | 5 |
| Com. Ex. 1 | 0 | 100 | 88 | 88 | 10 |

The results of Table 1 demonstrate that the optical recording media of Examples 1 to 4 may absorb effectively the informing light and the reference light which have missed to reflect at the filter layer formed of dielectric vapor deposition layer by virtue of laminating the optical absorption layer, thus the thickness of the optical absorption layer is 5 μm to 20 μm, and the thickness of the gap layer is 80 μm to 95 μm.

2. The optical recording medium according to claim 1, wherein the composition of the optical absorption layer comprises at least one of dyes and pigments which contains at least one of phthalocyanine dyes, cyanine dyes and azo dyes.

3. The optical recording medium according to claim 1, wherein the optical absorption layer represents a transmissivity of 0.001% to 50% for the light having a wavelength within 350 nm to 600 nm and a transmissivity of 50% to 100% for the light having a wavelength within 600 nm to 655 nm.

4. The optical recording medium according to claim 1, wherein the filter layer reflects the light having a wavelength within 350 nm to 600 nm and transmits the light having a wavelength within 600 nm to 655 nm and, the light having a wavelength within 600 nm to 655 nm is different in wavelength from the light having a wavelength within 350 nm to 600 nm.

5. The optical recording medium according to claim 1, wherein the filter layer is formed of at least one of a color material-containing layer, a dielectric vapor deposition layer and a cholesteric liquid crystal layer.

6. A method of producing an optical recording medium, wherein the method comprises at least:
   laminating an optical absorption layer on a second substrate, and
   forming a filter layer on an optical absorption layer, wherein the optical recording medium comprises:
   a first substrate, a recording layer, the filter layer, the optical absorption layer and the second substrate in this order,
   wherein the recording layer records information by use of holography,
   the optical absorption layer comprises any one of dyes and pigments which absorb a light having a wavelength within 350 nm to 600 nm and which transmit a light having a wavelength within 600 nm to 655 nm,
   a gap layer is provided between the optical absorption layer and the second substrate, wherein the gap layer is formed on a reflective film formed on the second substrate, and
   the thickness of the optical absorption layer is 5 µm to 20 µm, and the thickness of the gap layer is 80 µm to 95 µm.

7. An optical recording method for recording information, comprising:
   irradiating an informing light onto an optical recording medium in a manner that the optical axis of the informing light and the optical axis of the reference light are coaxial each other, and
   recording information on a recording layer by use of an interference pattern generated by the interference between the informing light and the reference light, wherein the optical recording medium comprises:
   a first substrate, the recording layer, a filter layer, an optical absorption layer and a second substrate in this order,
   wherein the recording layer records information by use of holography,
   the optical absorption layer comprises any one of dyes and pigments which absorb a light having a wavelength within 350 nm to 600 nm and which transmit a light having a wavelength within 600 nm to 655 nm,
   a gap layer is provided between the optical absorption layer and the second substrate, wherein the gap layer is formed on a reflective film formed on the second substrate, and
   the thickness of the optical absorption layer is 5 µm to 20 µm, and the thickness of the gap layer is 80 µm to 95 µm.

8. An optical reproducing method, comprising:
   irradiating a reproducing light onto the interference pattern of the recording layer to which information is recorded by the optical recording method according to claim 7 to reproduce the recorded information,
   wherein the reproducing light is the same as the reference light.

9. The optical reproducing method according to claim 8, wherein the reproducing light is irradiated onto the interference pattern to reproduce the recorded information in a manner that the reproducing light is irradiated with the same angle as that of the reference light utilized for recording the optical recording medium.

* * * * *